US012710679B2

(12) United States Patent
Sheng et al.

(10) Patent No.: US 12,710,679 B2
(45) Date of Patent: Aug. 18, 2026

(54) DISPLAY PANEL AND DISPLAY DEVICE

(71) Applicant: Shanghai Tianma Micro-electronics Co., Ltd., Shanghai (CN)

(72) Inventors: Chenhang Sheng, Shanghai (CN); Wenxin Jiang, Shanghai (CN)

(73) Assignee: Shanghai Tianma Micro-electronics Co., Ltd., Shanghai (CN)

( * ) Notice: Subject to any disclaimer, the term of this patent is extended or adjusted under 35 U.S.C. 154(b) by 293 days.

(21) Appl. No.: 18/410,442

(22) Filed: Jan. 11, 2024

(65) Prior Publication Data

US 2025/0004345 A1 Jan. 2, 2025

(30) Foreign Application Priority Data

Jun. 30, 2023 (CN) ......................... 202310799240.1

(51) Int. Cl.
*G02F 1/1677* (2019.01)
*G02F 1/167* (2019.01)

(52) U.S. Cl.
CPC ............ *G02F 1/1677* (2019.01); *G02F 1/167* (2013.01)

(58) Field of Classification Search
CPC ............................... G02F 1/1677; G02F 1/167
USPC .................................. 359/265, 296; 345/107
See application file for complete search history.

(56) References Cited

U.S. PATENT DOCUMENTS

2009/0032402 A1* 2/2009 Jang ........................ G02F 1/167 204/627

FOREIGN PATENT DOCUMENTS

CN 102608821 A 7/2012

* cited by examiner

*Primary Examiner* — William Choi
(74) *Attorney, Agent, or Firm* — Anova Law Group, PLLC

(57) ABSTRACT

One aspect of the present disclosure provides a display panel and a display device. The display panel includes an array substrate, an opposite substrate disposed opposite to the array substrate, and a sieve plate between the array substrate and opposite substrate. The sieve plate includes sieve holes penetrating the sieve plate along the thickness direction of the display panel. The display panel further includes electrophoretic particles that include first-color electrophoretic particles. The particle size of at least one of the first-color electrophoretic particles is smaller than the size of the sieve hole. The first-color electrophoretic particle may freely pass through the sieve hole toward the output surface of the display panel.

19 Claims, 12 Drawing Sheets

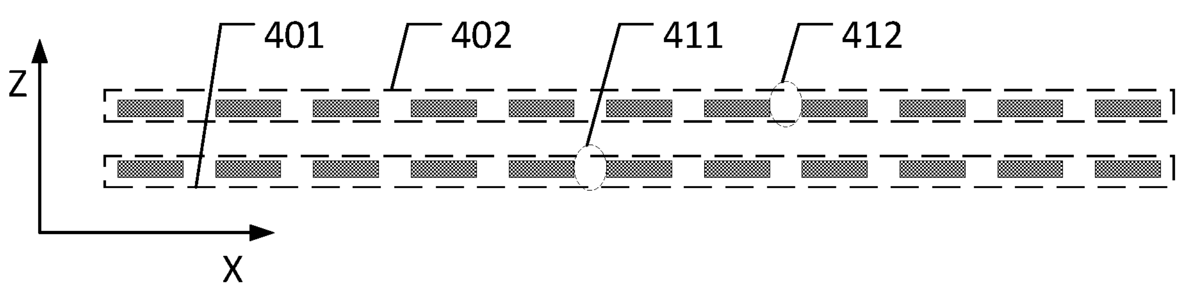
FIG. 6
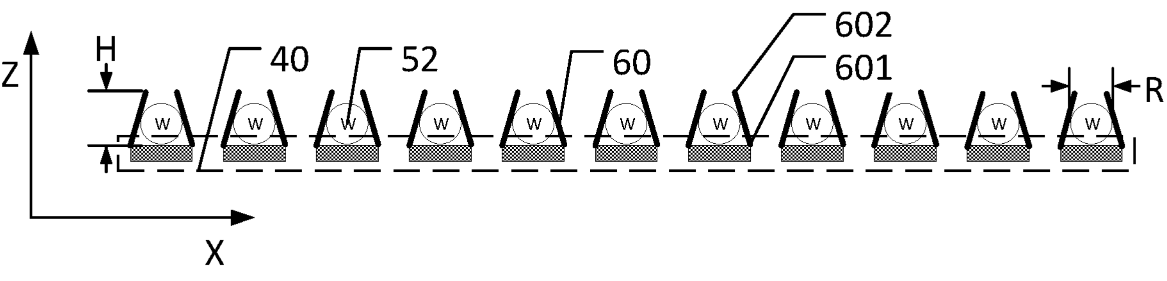
FIG. 7
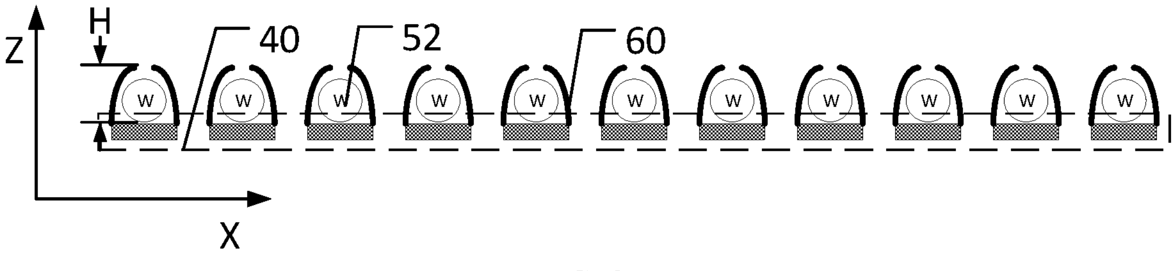
FIG. 8
FIG. 9

DISPLAY PANEL AND DISPLAY DEVICE

CROSS-REFERENCE TO RELATED APPLICATION

This application claims the priority of Chinese Patent Application No. 202310799240.1, filed on Jun. 30, 2023, the content of which is incorporated herein by reference in its entirety.

TECHNICAL FIELD

The present disclosure generally relates to the field of display technology and, more particularly, relates to display panels and display devices.

BACKGROUND

In the existing technology, electrophoretic display devices usually include two types, black-and-white display and color display. Black-and-white electrophoretic display devices include black and white electrophoretic particles. The black and white electrophoretic particles have different charge polarities. Color electrophoretic display devices include electrophoretic particles of more than three colors. These particles have different charge polarities. For black-and-white electrophoretic displays and color electrophoretic displays, a required color is obtained by movements of different particles that cause reflection and scattering of different colors on the top of an electrophoretic display device. However, it is relatively slow for electrophoretic particles of at least one color to move toward the top, which causes low refresh frequency and increases the power consumption of the electrophoretic display device.

The disclosed structures and methods are directed to at least partially alleviate one or more problems set forth above and to solve other problems in the art.

SUMMARY

One aspect of the present disclosure provides a display panel that includes an array substrate, an opposite substrate disposed opposite to the array substrate, a sieve plate between the array substrate and opposite substrate, and electrophoretic particles. The sieve plate includes sieve holes. The sieve holes penetrate the sieve plate along a thickness direction of the display panel. The electrophoretic particles include first-color electrophoretic particles. A particle size of at least one of the first-color electrophoretic particles is smaller than a size of the sieve hole.

Another aspect of the present disclosure provides a display device that contains a display panel. The display panel includes an array substrate, an opposite substrate disposed opposite to the array substrate, a sieve plate between the array substrate and opposite substrate, and electrophoretic particles. The sieve plate includes sieve holes. The sieve holes penetrate the sieve plate along a thickness direction of the display panel. The electrophoretic particles include first-color electrophoretic particles. A particle size of at least one of the first-color electrophoretic particles is smaller than a size of the sieve hole.

Other aspects or embodiments of the present disclosure can be understood by those skilled in the art in light of the description, the claims, and the drawings of the present disclosure.

BRIEF DESCRIPTION OF THE DRAWINGS

The accompanying drawings, which are incorporated in and constitute a part of the specification, illustrate embodiments of the present disclosure and, together with the description, serve to explain the principles of the present disclosure. The drawings are merely examples for illustrative purposes according to various disclosed embodiments and are not intended to limit the scope of the present disclosure.

FIG. 6 illustrates a schematic structural diagram of a sieve plate of FIG. 4 according to various disclosed embodiments of the present disclosure;

FIG. 7 illustrates a schematic diagram of a sieve plate, blocking members, and second-color electrophoretic particles according to various disclosed embodiments of the present disclosure;

FIG. 8 illustrates another schematic diagram of a sieve plate, blocking members, and second-color electrophoretic particles according to various disclosed embodiments of the present disclosure;

FIG. 9 illustrates another schematic diagram of a sieve plate, blocking members, and second-color electrophoretic particles according to various disclosed embodiments of the present disclosure;

DETAILED DESCRIPTION

Figure 1:
FIG. 1 illustrates a schematic diagram of a display panel according to various disclosed embodiments of the present disclosure.
Figure 1:
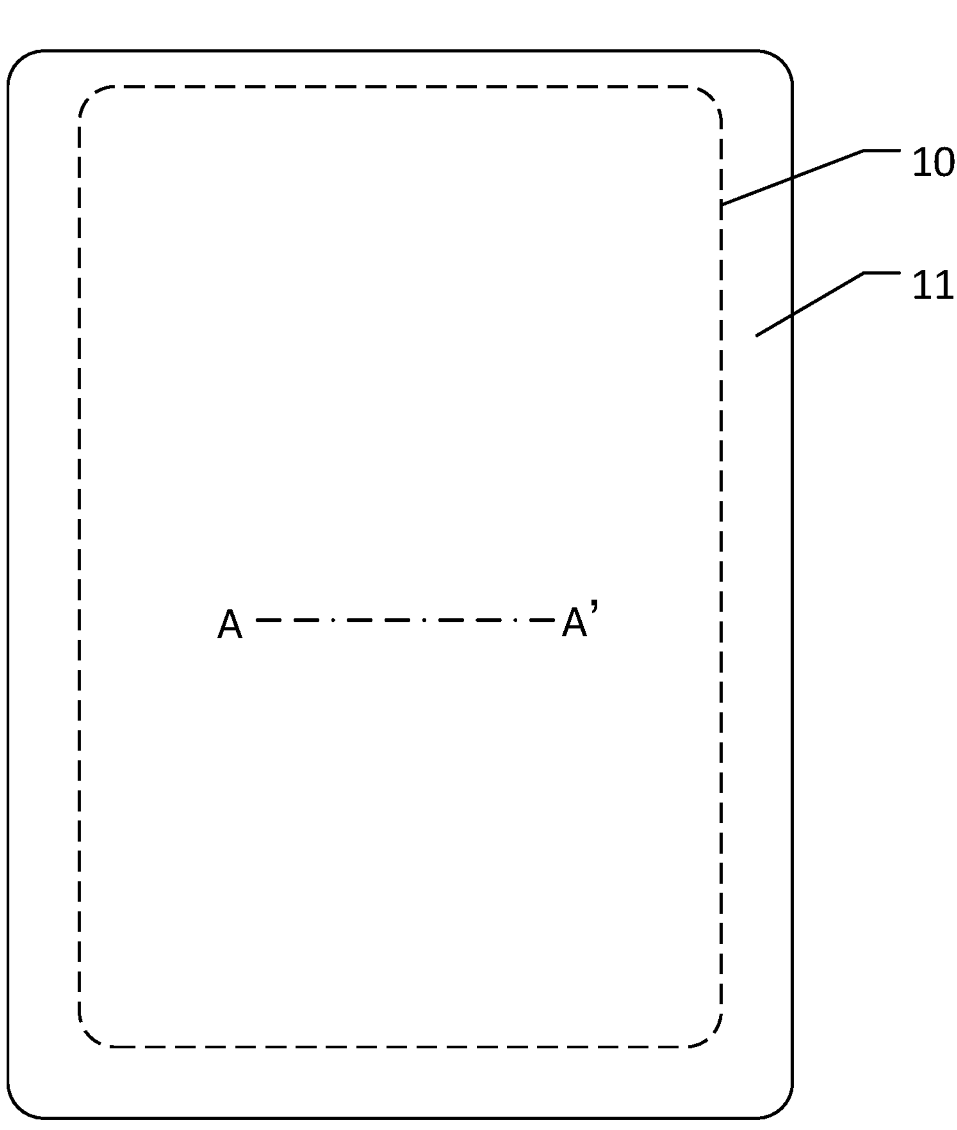

Reference will now be made in detail to exemplary embodiments of the disclosure, which are illustrated in the accompanying drawings. Unless otherwise specifically stated, the relative arrangement of components and steps, numerical expressions, and numerical values set forth in these embodiments do not limit the scope of the invention.

The following description for at least one exemplary embodiment is merely illustrative in nature and is in no way intended to limit the invention, its application, or uses.

Techniques, methods, and devices known to those of ordinary skill in the relevant art may not be discussed in detail, but where appropriate, such techniques, methods, and devices should be considered a part of the specification.

In all examples shown and discussed herein, any specific values are to be construed as illustrative only and not as limiting. Accordingly, other examples of the exemplary embodiments may have different values.

It should be noted that similar reference numerals and letters indicate similar items in the following figures. Therefore, once an item is defined in one figure, it does not require further discussion in the following figures.

The present disclosure provides a display panel and a display device to improve the problems of low refresh frequency and high power consumption of electrophoretic display devices.

A first aspect of the present disclosure provides a display panel. The display panel includes an array substrate, an opposite substrate disposed opposite to the array substrate, and a sieve plate disposed between the array substrate and opposite substrate. The sieve plate includes sieve holes. The sieve holes penetrate through the sieve plate along the thickness direction of the display panel. The display panel at least further includes electrophoretic particles. The electrophoretic particles include first-color electrophoretic particles. The particle size of at least one of the first-color electrophoretic particles is smaller than the size of the sieve holes.

The second aspect of the present disclosure provides a display device. The display device includes the display panel illustrated above.

Compared with the existing technology, the display panel and display device provided by the present disclosure at least achieve the following beneficial effects:

The present disclosure provides a display panel and a display device. The display panel includes an array substrate and an opposite substrate that are arranged oppositely. A sieve plate is configured between the array substrate and opposite substrate. Electrophoretic particles are also configured between the array substrate and opposite substrate. The sieve plate includes sieve holes penetrating through the sieve plate along the thickness direction. The electrophoretic particles include first-color electrophoretic particles whose particle size is smaller than the size of the sieve holes. The sieve plate is used to fix positions of part of the electrophoretic particles with a particle size larger than the sieve holes, providing the display base color of the display panel. At least the first-color electrophoretic particles move to the side of the display surface of the display panel to show a corresponding image when there is a display requirement. When the display requirement of the display panel is to show the base color, movements of electrophoretic particles are not required to achieve image display. Color display showing the base color is achieved through electrophoretic particles at fixed positions or the color of the sieve plate itself. Compared with the existing technology, the movement control of electrophoretic particles of one color is reduced. It facilitates increasing of the refresh frequency of related display devices and reducing display power consumption.

Any product implementing the present disclosure does not necessarily need to achieve all the above-mentioned technical effects at the same time.

Other features of the present disclosure and its advantages will become apparent from the following detailed description of exemplary embodiments of the present disclosure with reference to the accompanying drawings.

As used herein, the term “image” indicates an image displayed or to be displayed by a display panel; the terms “show” and “display” as verbs have the same meanings and are interchangeable; the terms “base color” and “display base color” each indicate a background color of a corresponding display panel; and the term “thickness direction” indicates a thickness direction of a corresponding display panel.

In some cases, a display panel includes black, white, red, and yellow electrophoretic particles. The black and yellow electrophoretic particles are one group, and the red and white electrophoretic particles are another group. The two groups of particles carry charges of different polarities, and there are differences in the quantities of charges within each group. An electric field is set up by electrodes on the two sides of the electrophoretic particles. The electrophoretic particles may be driven to move by the direction and intensity of the electric field. Driven by the electric field, some electrophoretic particles move to the top of the output side of the display panel, and create colors such as black or white that may be seen by an observer. Because there are a certain amount of electrophoretic particles in the display panel, and there is attraction and separation between different charges, voltage changes need to be tested to determine appropriate color driving waveforms and voltage values. Then, a look up table (LUT) is made, and the LUT is used when a color is displayed. However, such a method may affect display speed and increase display power consumption. Embodiments illustrated below may improve the refresh frequency and power consumption of electrophoretic display devices.

Figure 2:
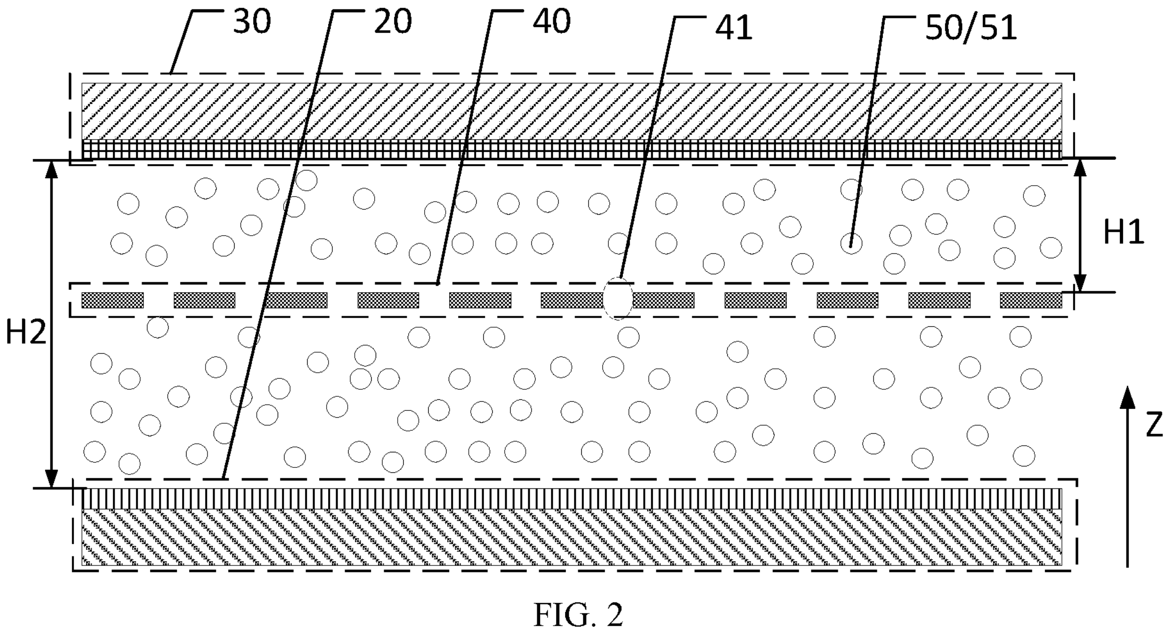
FIG. 2 illustrates a cross-sectional view taken along line AA' of FIG. 1 according to various disclosed embodiments of the present disclosure.
Figure 3:
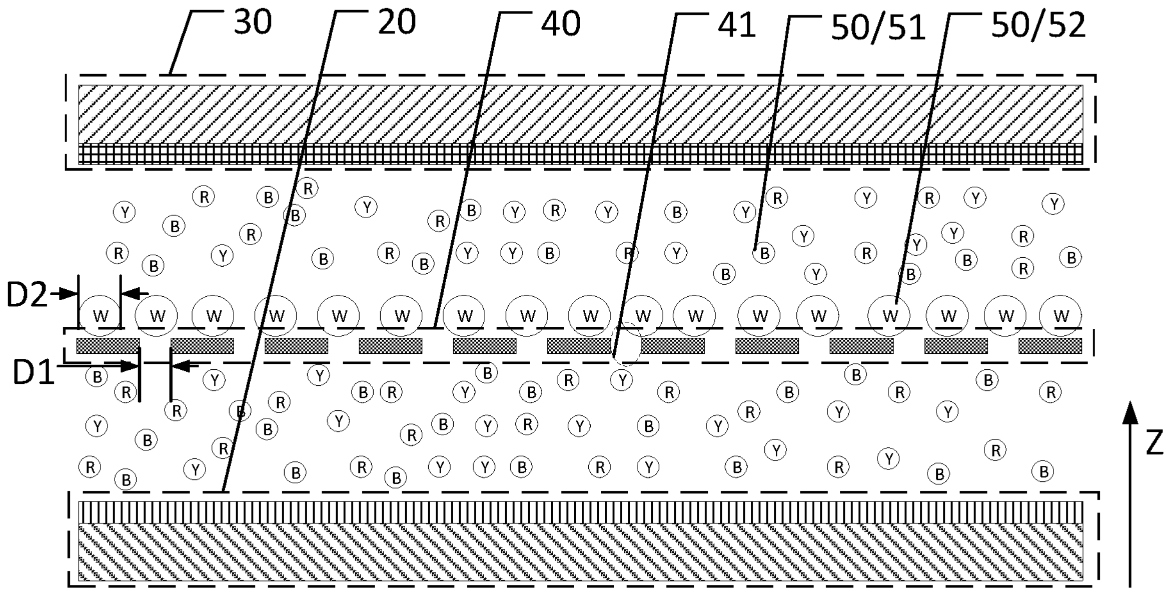
FIG. 3 illustrates another cross-sectional view taken along line AA' of FIG. 1 according to various disclosed embodiments of the present disclosure.

FIGS. 1, 2, and 3 schematically illustrate a diagram of a display panel 100, a cross-sectional view taken along line AA' of FIG. 1, and another cross-sectional view taken along line AA' of FIG. 1 according to the present disclosure. The display panel 100 includes an array substrate 20, an opposite substrate 30 arranged opposite to the array substrate 20, and a sieve plate 40 between the array substrate 20 and opposite substrate 30. The sieve plate 40 includes sieve holes 41 that penetrate through the sieve plate 40 along the thickness direction of the display panel 100. In some cases, the sieve plate 40 and sieve hole 41 may also be referred to as screen plate 40 and screen hole 41. The display panel 100 at least further includes electrophoretic particles 50. The electrophoretic particles 50 include first-color electrophoretic particles 51. The particle size of at least one first-color electrophoretic particle 51 is smaller than the size of the sieve hole 41.

Optionally, the display panel 100 includes a display region 10 and a non-display region 11 that at least partially surrounds the display region 10. Along the thickness direction Z, the display panel 100 includes the array substrate 20, the opposite substrate 30, and the sieve plate 40. The opposite substrate 30 and array substrate 20 are arranged oppositely, and the sieve plate 40 is disposed between the array substrate 20 and opposite substrate 30. The sieve holes 41 are configured in the sieve plate 40 and penetrate the sieve plate 40 along the thickness direction Z. Further, the display panel 100 is also provided with the electrophoretic particles 50. The electrophoretic particles 50 at least include the first-color electrophoretic particles 51. The electrophoretic particles 50 are between the array substrate 20 and opposite substrate 30, and at least include one or more first-color electrophoretic particles 51 whose particle size is smaller than the size of the sieve hole 41. As such, the display panel 100 includes the first-color electrophoretic particles 51 that may freely go through the sieve holes 41 of the sieve plate 40 and move toward the output surface side of the display panel 100. Optionally, the output surface side of the display panel 100 may also be referred to as the light output side of the display panel 100. To show an image, the first-color electrophoretic particles or both the first-color electrophoretic particles 51 and the sieve plate 40 are utilized, which may achieve at least part of the image display effect required by the display panel 100.

In addition, the present disclosure does not limit the color type included in the first-color electrophoretic particles 51 that are provided in the display panel 100. The color type included in the first-color electrophoretic particles 51 may be selected and set according to the display requirements of the display panel 100.

Further, this present disclosure does not limit the color and position of the sieve plate 40. The color and position of the sieve plate 40 may be selected and set according to display requirements of the display panel 100. For example, the color of the sieve plate 40 may be selected and set according to the display base color (or background color) requirement of the display panel 100, and the position of the sieve plate 40 may be selected according to the image display requirement of the display panel 100.

Optionally, the display panel 100 includes electrophoretic particles 52 of a certain color whose particle size is larger than the size of the sieve hole 41. The position of the electrophoretic particle 52 with a larger particle size in the display panel 100 may be fixed through the sieve plate 40. Further, the color displayed by the electrophoretic particle 52 with a larger particle size may be set as the display base color of the display panel 100. As such, when the display color requirement of the display panel 100 is to show the base color, movements of the electrophoretic particles 51 whose particle size is smaller than the size of the sieve hole 41 is not required to achieve image display. Color display showing the base color may be achieved by the electrophoretic particles 52 of a certain color at fixing positions. Compared with the existing technology, the movement control of electrophoretic particles of the certain color is reduced. It may facilitate improving the refresh frequency of related display devices and reducing display power consumption.

For example, in the current technology, black and white particles are arranged in a display panel to achieve reflection and scattering of black and/or white color at the top of the display panel, thereby obtaining the required display color. But in this process, it is necessary to control the simultaneous movements of the black and white particles. As it is relatively slow to drive the black and white particles to move at the same time, the refresh frequency of the display panel is low. The present disclosure uses the sieve plate 40 to fix positions of the electrophoretic particles 52 with a larger particle size in the display panel 100, and uses the color of the particle 52 as the base color (e.g., white color) of the display panel 100. When the display panel 100 illustrates black color, it only needs to drive at least some of the black electrophoretic ions (e.g., the electrophoretic particles 51) to move toward the output surface of the display panel. When the display panel 100 illustrates only white color, the electrophoretic particles 52 with a larger particle size at fixed positions may achieve white display. It only needs to drive the black electrophoretic ions to move toward the white electrophoretic particles and move away from the output surface of the display panel. Thus, compared with the existing technology that requires driving black and white electrophoretic particles at the same time, the embodiment illustrated above reduces movements of one type of particles (e.g., the white electrophoretic particle 52). It may increase the movement rate of electrophoretic particles in the display panel, thereby increasing the display refresh frequency.

Optionally, the sieve plate 40 of the display panel 100 has a certain color. The color of the sieve plate 40 may be set to be the display base color of the display panel 100 in some cases. With this arrangement, when the display color requirement of the display panel 100 is to show the base color, there is no need for movements of the electrophoretic particles 51 whose particle size is smaller than the size of the sieve hole 41 to achieve image display. Thus, color display showing the base color may be realized by using the sieve plate 40 with a certain color. Compared with the existing technology, the setting and movement control of electrophoretic particles of one color are no longer required. It may be used to increase the refresh frequency of related display devices and reduce display power consumption.

Referring to FIGS. 1 and 2, optionally, the sieve plate 40 has a first color and is opaque. The first-color electrophoretic particles 51 have a second color, and the second color is different from the first color.

In some cases, the sieve plate 40 has the first color and is opaque or not transparent. For example, the light transmittance of the sieve plate 40 with the first color may be close to 0% or less than a certain percentage. The first-color electrophoretic particles 51 have the second color different from the first color of the sieve plate 40. As such, the first color of the sieve plate 40 may be used as the display base color of the display panel 100. When the display color requirement of the display panel 100 is to show the base color, movements of the electrophoretic particles 50 whose particle size is smaller than the size of the sieve hole 41 are not required to achieve image display. Color display showing the base color may be achieved by using the sieve plate 40 with the first color. Compared with the existing technology, the setting of electrophoretic particles used to show the base color and related movement control are not needed. It may help increasing the refresh frequency of related display devices and reducing display power consumption.

Further, the display panel 100 provided by the present disclosure may be used as electronic paper. The display principle of electronic paper is that ambient light is reflected by electrophoretic particles in the display panel, causing display of a corresponding color. Thus, the sieve plate 40 may be set to be opaque to achieve reflection of the ambient light. After the external ambient light is irradiated to the surface of the sieve plate 40 and then reflected, the first color of the sieve plate 40 may be displayed on the output surface of the display panel.

When the display color requirement of the display panel 100 includes the second color, movements of the first-color electrophoretic particles 51 may be arranged so that the first-color electrophoretic particles 51 move to the output surface side of the display panel 100. As such, images shown on the display panel 100 may include the second color. For example, the sieve plate 40 may be white and the first-color electrophoretic particles 51 may be black. It is equivalent to disposing only black electrophoretic particles 50, i.e., electrophoretic particles of one color, in the display panel 100. Disposing only black electrophoretic particles 50 may enable black-and-white display of the display panel 100. Compared with the existing technology that requires driving black and white electrophoretic particles simultaneously, the embodiment reduces movements of one type of particles (i.e., the white electrophoretic particle) and only needs to control movements of the black electrophoretic ions. This may help increase the movement rate of electrophoretic particles in the display panel and increase the display refresh frequency of the display panel.

In some cases, when the display panel is only used for black-and-white display, the first color and second color may be white and black, respectively. When the display panel is used for color display, the first color may be set to white and the second color to colors including red, yellow, blue, black, etc.

Referring to FIGS. 1 and 3, in addition to the above-mentioned first-color electrophoretic particles 51 whose particle size is smaller than the size of the sieve hole 41, the electrophoretic particles 50 in the display panel 100 may further include second-color electrophoretic particles 52 in some cases. The color of the second-color electrophoretic particles 52 is different from the color of the first-color electrophoretic particles 51, and at least some of the second-color electrophoretic particles 52 have a particle size larger than the sieve hole size. The color of the second-color electrophoretic particles 52 may be further set to the first color, and the second-color electrophoretic particles 52 may be positioned on a side of the sieve plate 40 facing the output surface of the display panel 100. Then, the sieve plate 40 and the second-color electrophoretic particles 52 together may be used for the display requirement of the base color for the display panel 100. That is, the second-color electrophoretic particles 52 and sieve plate 40 jointly reflect the light irradiated from the output surface side of the display panel 100, thereby enabling the display panel 100 to display the first color. It may improve the display effect of the first color at the display panel 100.

Figure 4:
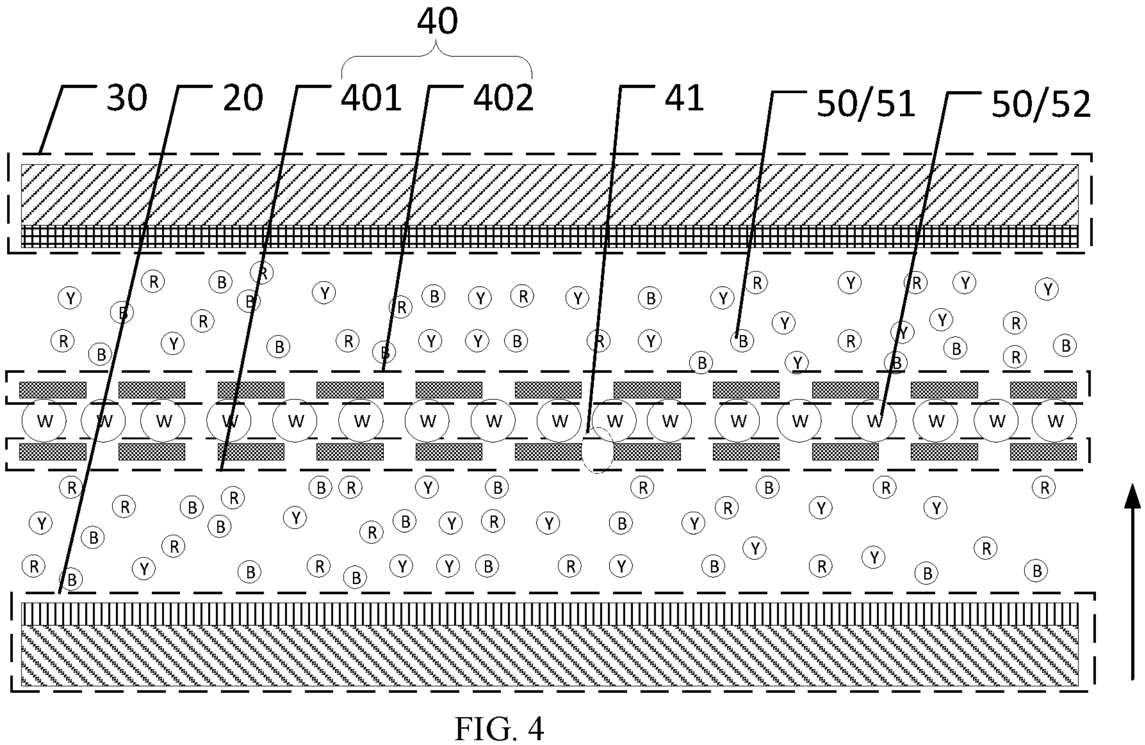
FIG. 4 illustrates another cross-sectional view taken along line AA' of FIG. 1 according to various disclosed embodiments of the present disclosure.

FIG. 4 illustrates another cross-sectional view taken along line AA' of FIG. 1 according to the present disclosure. Referring to FIGS. 1 and 4, the display panel 100 includes two sieve plates 40 in some cases. In addition to the above-mentioned first-color electrophoretic particles 51 whose particle size is smaller than the size of the sieve hole 41, the electrophoretic particles 50 in the display panel 100 may further include second-color electrophoretic particles 52. The color of the second-color electrophoretic particles 52 is different from the color of the first-color electrophoretic particles 51, and at least some of the second-color electrophoretic particles 52 have a particle size larger than the size of the sieve hole 41. The color of the second-color electrophoretic particles 52 may be further set to the first color, and the second-color electrophoretic particles 52 may be positioned between the two sieve plates 40. Optionally, the sieve plate 40 that is closer to the output surface side of the display panel 100 may be transparent, and the sieve plate 40 that is farther away from the output surface side of the display panel 100 may have the first color. As such, the sieve plate 40 that is farther away from the output surface side of the display panel 100 and the second-color electrophoretic particles 52 may be used jointly for the display requirement of showing the base color for the display panel 100. That is, the second-color electrophoretic particles 52 and the sieve plate 40 farther away from the output surface side of the display panel 100 together reflect the light irradiated from the output surface side of the display panel 100, making the display panel 100 show the first color. It may improve the display effect of the display panel 100 showing the first color.

Referring to FIGS. 1 and 3, the sieve plate 40 contains transparent materials in some cases. The electrophoretic particles 50 also include the second-color electrophoretic particles 52. The color of the second-color electrophoretic particles 52 is different from the color of the first-color electrophoretic particles 51. Further, at least one second-color electrophoretic particle 52 has a particle size larger than the size of the sieve hole 41.

Optionally, the sieve plate 40 is made of transparent materials, such that the sieve plate 40 has light transmittance close to 100%. In addition to the above-mentioned first-color electrophoretic particles 51 whose particle size is smaller than the size of the sieve hole 41, the electrophoretic particles 50 in the display panel 100 may further include second-color electrophoretic particles 52. The color of the second-color electrophoretic particles 52 is different from the color of the first-color electrophoretic particles 51, and at least some of the second-color electrophoretic particles 52 have a particle size larger than the size of the sieve hole 41. Further, the second-color electrophoretic particles 52 may be disposed on the side of the sieve plate 40 facing the output surface of the display panel 100, and the color of the second-color electrophoretic particles 52 may be used as the display base color of the display panel 100. Then, when the display color requirement of the display panel 100 is to show the base color, there is no need for movements of the first-color electrophoretic particles 51 whose particle size is smaller than the size of the sieve hole 41 to achieve image display. Color display showing the base color may be achieved by the second-color electrophoretic particles 52 at fixed positions. When the display panel 100 needs at least part of the first-color electrophoretic particles 51 to move to the output surface side of the display panel 100 to achieve certain image display, it only controls movements of the at least part of the first-color electrophoretic particles 51. The second-color electrophoretic particles 52 need not to be driven to move, and just exist as display base color. Compared with the existing technology, the movement control of electrophoretic particles of one color is reduced. It may help increase the refresh frequency of related display devices and reduce display power consumption.

Optionally, the display panel 100 may be used as electronic paper. The display principle of electronic paper is that ambient light is reflected by electrophoretic particles in the display panel, thereby achieving display of corresponding colors. In the above embodiments, the sieve plate 40 is set to be transparent, so that the ambient light may pass through the transparent sieve plate. It avoids the influence of ambient light reflected by a sieve plate of a different color on a desired image color.

Optionally, when the required display base color of the display panel 100 is white, the second-color electrophoretic particles 52 may be white electrophoretic particles, while the color of the first-color electrophoretic particles 51 may be selected and set according to the needs. For example, the first-color electrophoretic particles 51 may be red electrophoretic particles R, yellow electrophoretic particles Y, blue electrophoretic particles B, etc.

With reference to FIGS. 1 and 3. Optionally, the second-color electrophoretic particles 52 are disposed between the sieve plate 40 and the opposite substrate 30.

In some cases, the opposite substrate 30 is arranged on the side of the array substrate 20 facing the output surface of the display panel 100. The second-color electrophoretic particles 52 are disposed between the transparent sieve plate 40 and the opposite substrate 30. That is, the second-color electrophoretic particles 52 are disposed on a side of the transparent sieve plate 40 facing the output surface of the display panel 100, and positions of the second-color electrophoretic particles 52 are fixed on a side surface of the transparent sieve plate 40 facing the opposite substrate 30. When the display color requirement of the display panel 100 is to show the base color, there is no need for movements of the first-color electrophoretic particles 51 whose particle size is smaller than the size of the sieve hole 41 to achieve image display. By reflecting the light irradiated from the output surface side of the display panel 100 through the second-color electrophoretic particles 52 at fixed positions, color display of the base color may be realized. Furthermore, when the second-color electrophoretic particles 52 are disposed between the sieve plate 40 and opposite substrate 30, the second-color electrophoretic particles 52 may be disposed closer to the output surface of the display panel 100. In such cases, when the display color requirement is to show the base color, the image display effect may be improved. In addition, when the display panel 100 needs at least part of the first-color electrophoretic particles 51 to move to the output surface side of the display panel 100 to achieve certain image display, it only needs to control movements of the at least part of the first-color electrophoretic particles 51. The second-color electrophoretic particles 52 do not need to be driven to move, and they just exist for showing the base color. Compared with the existing technology, the movement control of electrophoretic particles of one color is reduced. It may increase the refresh frequency of related display devices and reduce display power consumption.

Figure 5:
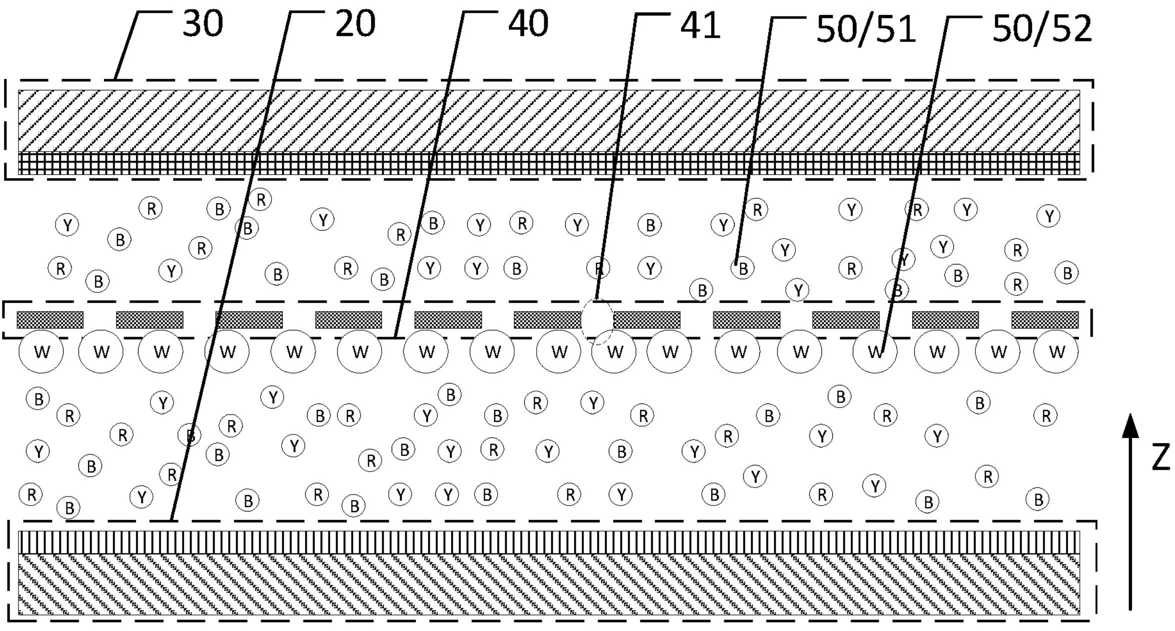
FIG. 5 illustrates another cross-sectional view taken along line AA' of FIG. 1 according to various disclosed embodiments of the present disclosure.

FIG. 5 illustrates another cross-sectional view taken along line AA' of FIG. 1 according to the present disclosure. Referring to FIGS. 1 and 5, the second-color electrophoretic particles 52 are located between the sieve plate 40 and array substrate 20 in some cases.

Optionally, the opposite substrate 30 is disposed on a side of the array substrate 20 facing the output surface of the display panel 100. The second-color electrophoretic particles 52 are arranged between the transparent sieve plate and the array substrate 20. For example, the second-color electrophoretic particles 52 may be disposed on a side of the transparent sieve plate 40 facing the array substrate 20. Positions of the second-color electrophoretic particles 52 are fixed on the side surface of the transparent sieve plate 40 facing the array substrate 20. Since the sieve plate 40 is transparent, it hardly blocks the light coming from the output surface side of the display panel 100. When the display color requirement of the display panel 100 is to show the base color, there is no need for movements of the first-color electrophoretic particles 51 whose particle size is smaller than the size of the sieve hole 41 to achieve image display. By reflecting the light irradiated from the output surface side of the display panel 100 through the second-color electrophoretic particles 52 at fixed positions, color display of the base color may be realized. Further, when the second-color electrophoretic particles 52 are disposed between the sieve plate 40 and array substrate 20, the second-color electrophoretic particles 52 are located farther away from the output surface of the display panel 100. When the display color requirement is other colors, the image display effect is less affected by the display base color, which may improve the display effect of other color images. In addition, when the display panel 100 needs at least part of the first-color electrophoretic particles 51 to move to the output surface side of the display panel 100 to achieve certain image display, it only needs to control movements of the at least part of the first-color electrophoretic particles 51. The second-color electrophoretic particles 52 do not need to be driven to move. Particles 52 just exist as the display base color. Compared with the existing technology, the movement control of electrophoretic particles 50 of one color is reduced, which is beneficial to increasing the refresh frequency of related display devices and reducing display power consumption.

As shown in FIGS. 1 and 4, the sieve plate 40 optionally includes a first sieve plate 401 and a second sieve plate 402 in the thickness direction Z. The second-color electrophoretic particles 52 are located between the first sieve plate 401 and second sieve plate 402.

In some cases, when the sieve plate 40 is made of a transparent material, the sieve plate 40 includes the first sieve plate 401 and second sieve plate 402 along the thickness direction Z. The second-color electrophoretic particles 52 may optionally be disposed between the first sieve plate 401 and second sieve plate 402. Positions of the second-color electrophoretic particles 52 are fixed by the first and second sieve plates 401 and 402. Since the sieve plate 40 is transparent, it hardly blocks the light coming from the output surface side of the display panel 100. When the display color requirement of the display panel 100 is to show the base color, there is no need for movements of the first-color electrophoretic particles 51 whose particle size is smaller than the size of the sieve hole 41 to achieve image display. By reflecting the light irradiated from the output surface side of the display panel 100 by the second-color electrophoretic particles 52 at fixed positions, color display of the base color may be realized. When the display panel 100 needs at least part of the first-color electrophoretic particles 51 to move to the output surface side of the display panel 100 to achieve certain image display, it only needs to control movements of the at least part of the first-color electrophoretic particles 51. The second-color electrophoretic particles 52 do not need to be driven to move, and they exist as the display base color. Compared with the existing technology, the movement control of electrophoretic particles of one color is reduced, which is beneficial to improving the refresh frequency of related display devices and reducing display power consumption.

FIG. 6 illustrates a schematic structural diagram of the sieve plate shown in FIG. 4 according to the present disclosure. As shown in FIGS. 1, 4, and 6, the sieve holes 41 include a first sieve hole 411 and a second sieve hole 412 in some cases. The first sieve hole 411 is located on the first sieve plate 401, and the second sieve hole 412 is located on the second sieve plate 402. Along the thickness direction Z, the first sieve hole 411 and second sieve hole 412 at least partially overlap.

Optionally, when the display panel 100 includes the first sieve plate 401 and second sieve plate 402, the sieve holes 41 in the first sieve plate 401 may be set as the first sieve holes 411, and the sieve holes 41 in the second sieve plate 402 may be set as the second sieve holes 412. Along the thickness direction Z, the first sieve hole 411 and second sieve hole 412 have at least a partial overlapping area. Furthermore, the first sieve plate 401 and second sieve plate 402 may be manufactured through the same process. The first sieve holes 411 and second sieve holes 412 are arranged with the same pattern and have the same sieve hole size. Further, along the thickness direction Z, oppositely arranged sets of first sieve holes 411 and second sieve holes 412 completely overlap. When the first-color electrophoretic particles 51 whose particle size is smaller than the sieve hole size of the sieve plate 40 need to pass through the sieve plate 40 and move toward the output surface side of the display panel 100, the movement path of the first-color electrophoretic particle 51 between the first sieve plate 401 and second sieve plate 402 may be a straight line. Compared to that movement paths of the first-color electrophoretic particles 51 between the first sieve plate 401 and the second sieve plate 402 are curves or polylines, it is conducive to improving the movement efficiency of the first-color electrophoretic particles 51. It may increase the refresh frequency of related display devices, and reduce display power consumption.

Figure 10:
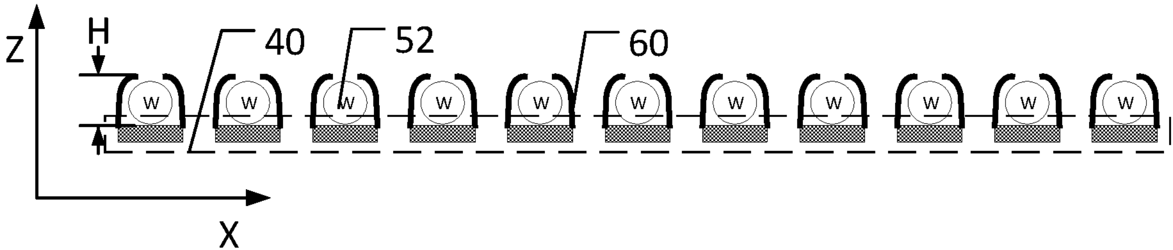
FIG. 10 illustrates another schematic diagram of a sieve plate, blocking members, and second-color electrophoretic particles according to various disclosed embodiments of the present disclosure.

FIG. 7 illustrates a schematic diagram of a sieve plate, blocking members, and second-color electrophoretic particles according to the present disclosure. FIG. 8 illustrates another schematic diagram of a sieve plate, blocking members, and second-color electrophoretic particles according to the present disclosure. FIG. 9 illustrates another schematic diagram of a sieve plate, blocking members, and second-color electrophoretic particles according to the present disclosure. FIG. 10 illustrates another schematic diagram of a sieve plate, blocking members, and second-color electrophoretic particles according to the present disclosure. As shown in FIGS. 1, 3-5, and 7-10, the display panel 100 further includes blocking members 60. The blocking member 60 is fixedly connected to the sieve plate 40, and used to limit or restrict the movement of the second-color electrophoretic particles 52 in the first direction X. The first direction X is a direction parallel to a plane where the sieve plate 40 is located.

Optionally, the transparent sieve plate 40 is provided and fixedly connected with the blocking members 60. The blocking members 60 are used to limit movements of the second-color electrophoretic particles 52 in a direction parallel to the plane of the sieve plate 40 to prevent the second-color electrophoretic particles 52 from blocking the sieve holes 41. Thus, the blocking members 60 are used to avoid blocking movement paths of electrophoretic particles of other colors and ensure the display effect of the display panel 100. In addition, by restricting movements of the second-color electrophoretic particles 52 in a direction parallel to the plane of the sieve plate 40, the second-color electrophoretic particles 52 in stable positions may be used as the display base color of the display panel 100. The display effect of the display panel 100 may be improved when the display image is the base color.

In some cases, the second-color electrophoretic particles 52 are fixed on a side surface of the sieve plate 40 facing the opposite substrate 30. In the thickness direction Z, the blocking member 60 protrudes toward the opposite substrate 30 and is a protrusion formed on a side of the sieve plate 40 facing the opposite substrate 30. That is, the distance from an end of the blocking member 60 away from the sieve plate 40 to the sieve plate 40 is greater than zero. In some other cases, the second-color electrophoretic particles 52 are fixed on a side surface of the sieve plate 40 facing the array substrate 20, and the blocking member 60 is a protrusion protruding toward the array substrate 20 and formed on the side of the sieve plate 40 facing the array substrate 20 in the thickness direction Z. That is, the distance from an end of the blocking member 60 away from the sieve plate 40 to the sieve plate 40 is greater than zero.

The blocking members 60 are arranged to hold the second-color electrophoretic particles 52 at predetermined positions. Along a direction parallel to the plane of the sieve plate 40, the distance between two adjacent blocking members 60 on the side close to the sieve plate 40 is greater than or equal to the particle size of the second-color electrophoretic particle 52. Thus, the second-color electrophoretic particle 52 may be placed between two adjacent blocking members 60. The distance between two adjacent blocking members 60 away from the sieve plate 40 is smaller than the particle size of the second-color electrophoretic particle 52. Thus the second-color electrophoretic particle 52 may be held in the two adjacent blocking members 60. As such, the blocking members 60 may fix positions of the second-color electrophoretic particles 52 in the display panel 100.

The blocking member 60 may have various shapes and configurations. For example, as shown in FIG. 7, the blocking member 60 may be a planar panel placed obliquely relative to the plane of the sieve plate 40 (i.e., a plane where the sieve plate 40 is located). That is, a plane where the blocking member 60 is located is inclined in a direction away from and relative to the sieve plate 40. As shown in FIG. 8, the blocking member 60 may be a curved panel relative to the plane of the sieve plate 40. As shown in FIG. 9, the blocking member 60 may contain two or more connected flat panels relative to the plane of the sieve plate 40. Additionally, as shown in FIG. 10, the blocking member 60 may contain curved and flat panels that are connected relative to the plane of the sieve plate 40. FIGS. 7-10 show various arrangement methods of the blocking members 60. The present disclosure is not limited by these exemplary methods. Alternative configurations and methods may be used, as long as the blocking members 60 may fix the position of the second-color electrophoretic particles 52 in the display panel 100.

Further, in some cases, the blocking members 60 and the sieve plate 40 connected to them may be integrally made in the same process. Alternatively, the blocking members 60 and the sieve plate 40 may be made separately and then fixedly connected or bonded together.

Referring to FIGS. 1, 3-5, and 7-10, the particle size of the second-color electrophoretic particles 52 is R. Along the thickness direction Z, the height of the blocking member 60 is H, and it is arranged that R×50%≤H≤R in some cases.

Optionally, the height of the blocking member 60 is H along the thickness direction Z, regardless of whether the blocking member 60 is formed by a flat panel, a curved panel, or a combination of flat and curved panels. The height of the blocking member 60 is not the surface length. H is the height of the entire blocking member 60 in the thickness direction Z.

That is, H is the height of the entire blocking member 60 in a direction perpendicular to the plane of the sieve plate 40. The particle size of the second-color electrophoretic particle 52 held by the blocking member 60 is R. Optionally, it is set that R×50%≤H≤R. If H<R×50%, the blocking member 60 may not stably hold the second-color electrophoretic particle 52. If H>R, the thickness of the display panel 100 is increased to a certain extent, which is not conducive to the thin design requirement of the display panel 100. Therefore, it is set that R×50%≤H≤R in some cases. On the one hand, the blocking member 60 may achieve stable fixation of the position of the second-color electrophoretic particle 52 in the display panel 100; and on the other hand, the thin design requirement of the display panel 100 may be taken into consideration, and thickness increase may be avoided.

Referring to FIGS. 1, 3-5, and 7-10, the blocking member 60 and the sieve hole 41 do not overlap in the thickness direction Z in some cases.

As illustrated above, the blocking member 60 occupies a certain space along a direction in the plane of the sieve plate 40. Optionally, there is no overlapping area between the blocking member 60 and the sieve hole 41 in the thickness direction Z. Thus, the space occupied by the blocking member 60 in the direction in the plane of the sieve plate 40 does not affect the area where the sieve hole 41 is located. It ensures the normal movement of the electrophoretic particles 50 with a particle size smaller than the sieve hole 41 in the display panel 100, and avoids the problem that the response speed of the electrophoretic particles 50 in the display panel 100 is slowed down by the arrangement of the blocking members 60. Positions of the second-color electrophoretic particles 52 in the display panel 100 are fixed by the blocking members 60, and diversified display effects of the display panel 100 are ensured at that same time. It is conducive to increasing the refresh frequency of related display devices and reducing display power consumption.

Referring to FIGS. 1, 3-5, and 7-10, the plane where the blocking member 60 is located is inclined in a direction away from the sieve hole 41 in some cases.

Optionally, the blocking member 60 includes a first end 601 and a second end 602. The first end 601 is fixedly connected to the sieve plate 40. Along the thickness direction Z, the second end 602 is away from the sieve plate 40 that fixes the first end. A set of blocking members 60 are used to hold the second-color electrophoretic particles 52. Along a direction parallel to the plane of the sieve plate 40, the distance between two adjacent first ends 601 of the set of blocking members 60 are set to be greater than the distance between two adjacent second ends 602. Along a direction parallel to the plane of the sieve plate 40, the distance between the two first ends 601 of the set of blocking members 60 is greater than or equal to the particle size of the second-color electrophoretic particles 52. Then, the second-color electrophoretic particles 52 may be placed in a set of the blocking members 60. The distance between the two second ends 602 in the set of blocking members 60 is smaller than the particle size of the second-color electrophoretic particle 52, so that the second-color electrophoretic particle 52 may be held in the set of blocking members 60. In this way, the blocking members 60 fix positions of the second-color electrophoretic particles 52 in the display panel 100. The plane where the blocking member 60 is located is tilted in a direction away from the sieve hole 41 to ensure that the blocking members 60 may stably fix the position of the second-color electrophoretic particle 52 in the display panel 100. At the same time, along the thickness direction Z, the blocking member 60 and the sieve hole 41 do not overlap. It avoids the problem that the response speed of the electrophoretic particles 50 in the display panel 100 slows down due to the setting of the blocking members 60, ensures diversified display effects of the display panel 100, and is conducive to increasing the refresh frequency of related display devices and reducing display power consumption.

Optionally, a set of the blocking members 60 used to hold the second-color electrophoretic particle 52 may be an integral component or may include multiple sub-structural elements. When a set of the blocking members 60 is an integral component, the integral component may surround at least part of the second-color electrophoretic particle 52. When a set of the blocking members 60 includes sub-structural elements, the sub-structural elements may surround at least part of the second-color electrophoretic particle 52.

Figure 11:
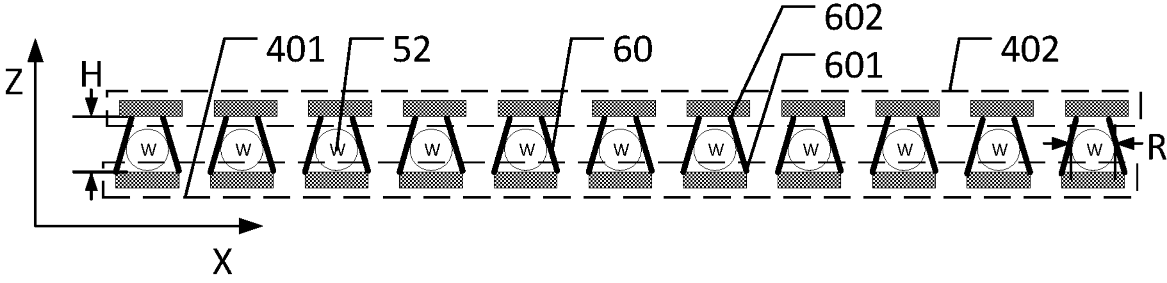
FIG. 11 illustrates another schematic diagram of a sieve plate, blocking members, and second-color electrophoretic particles according to various disclosed embodiments of the present disclosure.
Figure 12:
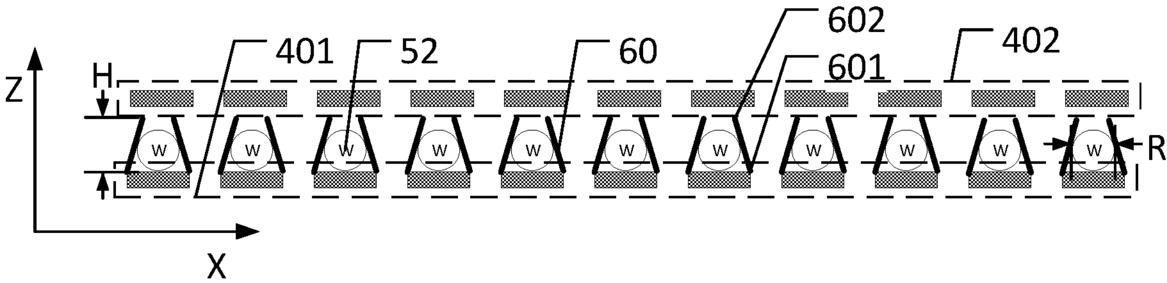
FIG. 12 illustrates another schematic diagram of a sieve plate, blocking members, and second-color electrophoretic particles according to various disclosed embodiments of the present disclosure.
Figure 13:
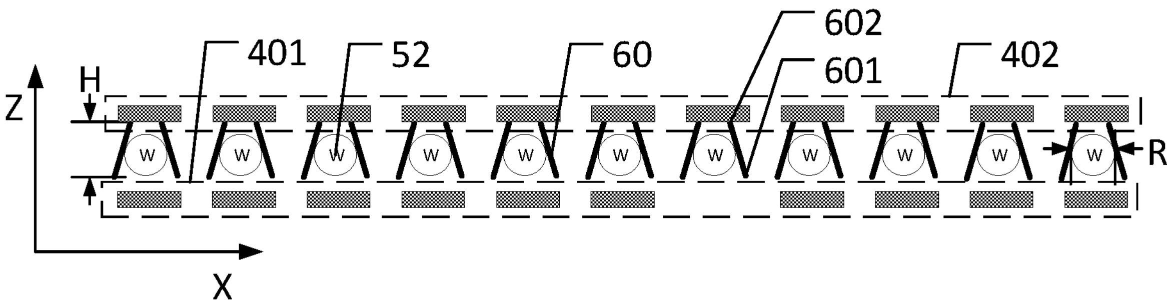
FIG. 13 illustrates another schematic diagram of a sieve plate, blocking members, and second-color electrophoretic particles according to various disclosed embodiments of the present disclosure.

FIG. 11 illustrates another schematic diagram of a sieve plate, blocking members, and second-color electrophoretic particles according to the present disclosure. FIG. 12 illustrates another schematic diagram of a sieve plate, blocking members, and second-color electrophoretic particles according to the present disclosure. FIG. 13 illustrates another schematic diagram of a sieve plate, blocking members, and second-color electrophoretic particles according to the present disclosure. With reference to FIGS. 1, 4 and 11-13. When the display panel 100 includes the first sieve plate 401 and second sieve plate 402 arranged oppositely (as shown in FIG. 11), the first ends 601 and the second ends 602 of the blocking member 60 are fixedly connected to the first sieve plate 401 and the second sieve plate 402, respectively. As shown in FIG. 12, it may also be arranged that the first ends 601 of the blocking member 60 are fixedly connected to the first sieve plate 401, and the second ends 602 are not fixedly connected to the second sieve plate 402. As shown in FIG. 13, it may also be arranged that the second ends 602 of the blocking member 60 are fixedly connected to the second sieve plate 402, while the first ends 601 are not fixedly connected to the first sieve plate 401. The present disclosure does not limit the specific arrangement between the blocking members 60 and the first sieve plate 401 and the second sieve plate 402, as long as the blocking members 60 can stably fix positions of the second color electrophoretic particles 52 in the display panel 100.

Optionally for a set of blocking members 60, the distance between the two second ends 602 in a direction parallel to the plane of the sieve plate 40 is smaller than the particle size of the first-color electrophoretic particles 51. It prevents the first-color electrophoretic particles 51 from moving into a set of blocking members 60 used to hold the second-color electrophoretic particles 52, prevents the first-color electrophoretic particles 51 from being mistakenly held, and ensures the display effect of the display device.

Figure 14:
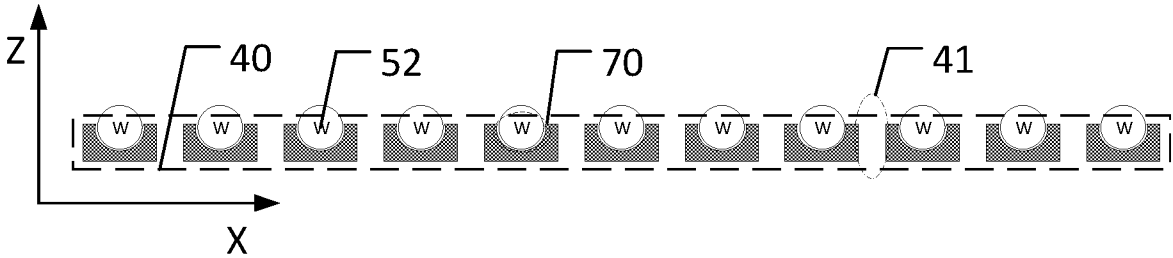
FIG. 14 illustrates a schematic diagram of a sieve plate, restriction grooves, and second-color electrophoretic particles according to various disclosed embodiments of the present disclosure.
Figure 15:
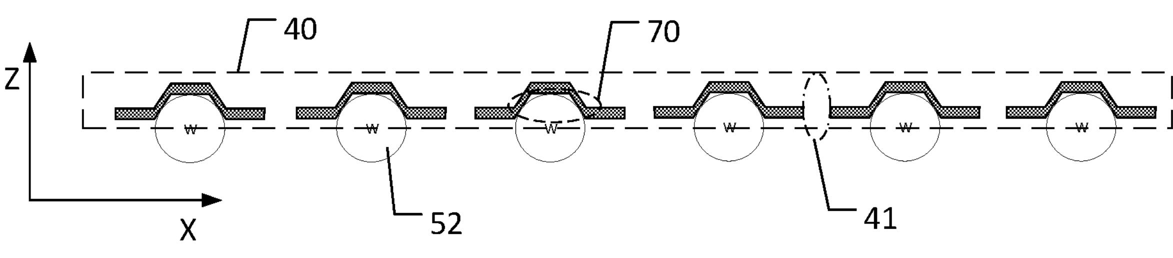
FIG. 15 illustrates another schematic diagram of a sieve plate, restriction grooves, and second-color electrophoretic particles according to various disclosed embodiments of the present disclosure.
Figure 16:
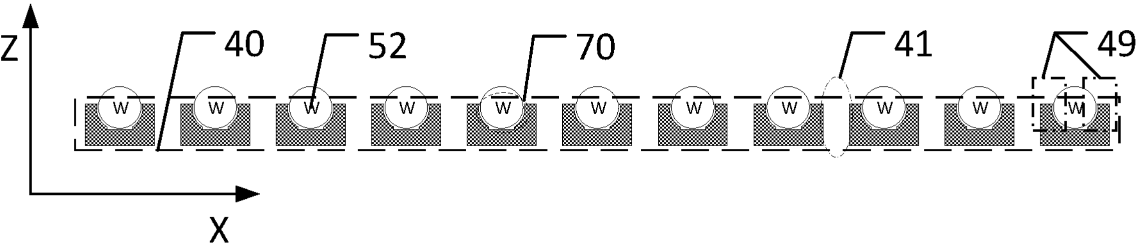
FIG. 16 illustrates another schematic diagram of a sieve plate, restriction grooves, and second-color electrophoretic particles according to various disclosed embodiments of the present disclosure.
Figure 17:
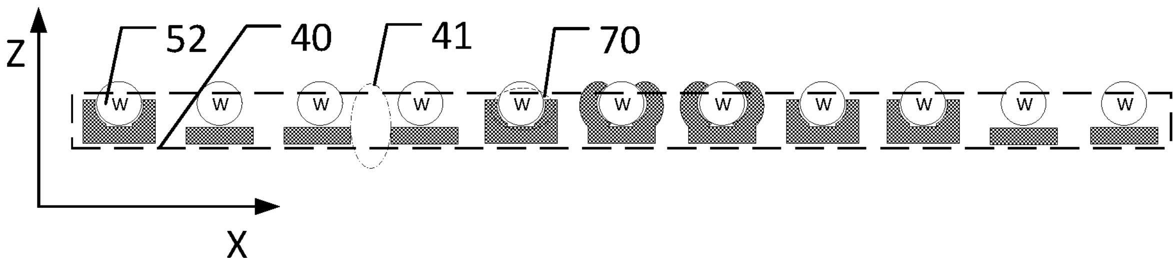
FIG. 17 illustrates another schematic diagram of a sieve plate, restriction grooves, and second-color electrophoretic particles according to various disclosed embodiments of the present disclosure.

FIG. 14 illustrates a schematic diagram of a sieve plate, restriction grooves, and second-color electrophoretic particles according to the present disclosure. FIG. 15 illustrates another schematic diagram of a sieve plate, restriction grooves, and second-color electrophoretic particles according to the present disclosure. FIG. 16 illustrates another schematic diagram of a sieve plate, restriction grooves, and second-color electrophoretic particles according to the present disclosure. FIG. 17 illustrates another schematic diagram of a sieve plate, restriction grooves, and second-color electrophoretic particles according to the present disclosure. Referring to FIGS. 1, 3-5, and 14-17, a side of the sieve plate 40 facing the second-color electrophoretic particles 52 includes restriction grooves 70, and at least some of the second-color electrophoretic particles 52 are located in the restriction grooves 70.

Optionally, restriction grooves 70 are formed on a side of the sieve plate 40 facing the second-color electrophoretic particles 52. At least part of the second-color electrophoretic particles 52 are located in the limiting grooves 70, so that positions of some of the second-color electrophoretic particles 52 in the display panel 100 are fixed through the restriction grooves 70. For example, the restriction grooves 70 combined with the sieve plate 40 may form a shape or configuration like an egg packaging box. The second-color electrophoretic particles 52 may be fixed in the egg placement spaces of the egg packaging box.

As shown in FIG. 16, the restriction grooves 70 may be formed by depressions on a side of the sieve plate 40 facing the second-color electrophoretic particles 52. The depression depresses in a direction away from the second-color electrophoretic particle 52. As shown in FIG. 16, a partial protruding structure 49 may also be formed on the side surface of the sieve plate 40 facing the second-color electrophoretic particles 52 in some cases. As shown in FIG. 15, a shape of the sieve plate 40 may also be arranged so that the sieve plate 40 directly forms the restriction grooves 70 in some cases. As shown in FIG. 17, different areas of the sieve plate 40 may be selected and manufactured according to requirements, so that some areas form the restriction grooves 70. Thus, the restriction grooves 70 may be formed in various shapes and structures. The thickness of the sieve plate 40 and the particle size of the second-color electrophoretic particle 52 may be utilized to design the restriction grooves 70.

In some cases, the restriction grooves 70 and the sieve plate 40 connected thereto may be integrally made using the same process. In some other cases, the restriction grooves 70 and the sieve plate 40 may be made separately and then fixedly connected.

Referring to FIGS. 1, 3-5, and 14-15, the restriction grooves 70 do not overlap with at least part of the sieve holes 41 along the thickness direction Z in some cases.

Optionally, along the thickness direction Z, the restriction grooves 70 and the sieve holes 41 may not overlap, so that the space occupied by the restriction grooves 70 in a direction in the plane of the sieve plate 40 does not affect the area of the sieve hole 41. It may ensure the normal movement of the electrophoretic particles 50 in the display panel 100 with a particle size smaller than the sieve hole 41, and avoid the problem that the setting of the restriction grooves 70 causes the response speed of the electrophoretic particles 50 to slow down in the display panel 100. It may achieve the fixation of positions of the second-color electrophoretic particles 52 in the display panel 100 through the restriction grooves 70, and the diversified display effects of the display panel 100 at the same time. It is conducive to increasing the refresh frequency of related display devices and reducing display power consumption.

Optionally in some cases, the restriction grooves 70 do not to overlap with some of the sieve holes 41 along the thickness direction Z. In some other cases, the restriction grooves 70 do not overlap with all the sieve holes 41.

Figure 18:
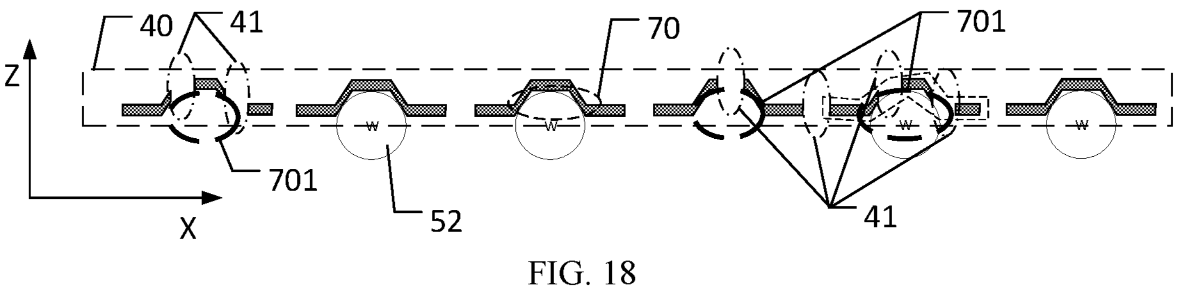
FIG. 18 illustrates another schematic diagram of a sieve plate, restriction grooves, and second-color electrophoretic particles according to various disclosed embodiments of the present disclosure.

FIG. 18 illustrates another schematic diagram of a sieve plate, restriction grooves, and second-color electrophoretic particles according to the present disclosure. Referring to FIGS. 1, 3-5, and 18, at least part of the restriction grooves 70 overlaps with at least part of the sieve holes 41 along the thickness direction Z.

Optionally, as shown in FIG. 18, restriction grooves 701 overlap with at least part of the sieve holes 41 along the thickness direction Z. The display panel 100 may be further configured such that the number of sieve holes 41 is greater than the number of restriction grooves 70. As such, even if there is a situation where some of the restriction grooves 70 (e.g., the restriction grooves 701) and the sieve holes 41 have an overlapping area in the thickness direction Z, a sufficient number of sieve holes 41 may enable movements of the electrophoretic particles 50 with a particle size smaller than the size of the sieve holes 41 in the display panel 100. The response speed of the electrophoretic particles 50 in the display panel 100 is not affected, and the impact on the refresh frequency of the display device is avoided.

Referring to FIGS. 1, 3-5, and 18, the number of the restriction grooves 70 overlapping the sieve holes 41 is greater than the number of first-color electrophoretic particles 51.

As mentioned, the particle size of the first-color electrophoretic particles 51 is smaller than the size of the sieve hole 41. Optionally, the restriction grooves 701 overlap with at least part of the sieve holes 41 along the thickness direction Z. Further, the number of the restriction grooves 701 overlapping the sieve holes 41 is greater than the number of the first-color electrophoretic particles 51. Thus, the display panel 100 has a sufficient number of sieve holes 41 to ensure that the first-color electrophoretic particles 51 may move freely through the sieve holes 41 from both sides of the sieve plate 40. In this way, the setting of the restriction grooves 70 does not affect the response speed of the electrophoretic particles 50 in the display panel 100, and does not affect the refresh frequency of the display device.

Figure 19:
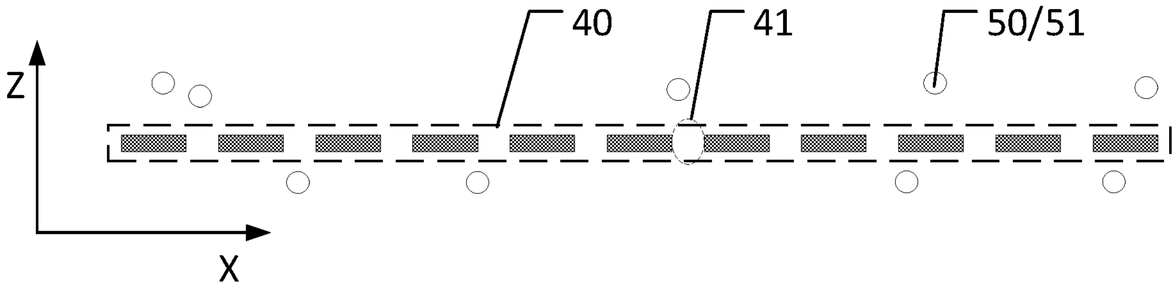
FIG. 19 illustrates a schematic diagram of a sieve plate and first-color electrophoretic particles according to various disclosed embodiments of the present disclosure.

FIG. 19 illustrates a schematic diagram of a sieve plate and first-color electrophoretic particles according to the present disclosure. Referring to FIGS. 1, 2, and 19, the number of sieve holes 41 is greater than the number of first-color electrophoretic particles 51 in some cases.

Optionally, the number of sieve holes 41 is greater than the number of first-color electrophoretic particles 51, so that the first-color electrophoretic particles 51 may move freely on both sides of the sieve plate 40. With an enough amount of the sieve holes 41, it may increase the movement rate of the first-color electrophoretic particles 51 through the sieve hole 41, avoid the impact of the setting of the sieve plate 40 on the response speed of the electrophoretic particles 50, ensure the refresh frequency of the display device, and avoid an increase in the display power consumption.

Referring to FIGS. 1-5, the electrophoretic particles 50 also include the second-color electrophoretic particles 52. The color of the second-color electrophoretic particles 52 is different from the color of the first-color electrophoretic particles 51.

The size of the sieve hole 41 is D1, and the particle size of the second-color electrophoretic particle 52 is D2. The particle size of the first-color electrophoretic particles 51 is D3. Optionally, it is arranged that $D2 \geq D1+0.1$ μm and $D1 \geq D3+0.1$ μm.

Optionally, besides the above-mentioned first-color electrophoretic particles 51 whose particle size is smaller than the size of the sieve hole 41, the electrophoretic particles 50 in the display panel 100 may further include second-color electrophoretic particles 52. The color of the second-color electrophoretic particle 52 is different from the color of the first-color electrophoretic particle 51. The size of the sieve hole 41 is D1, the particle size of the second-color electrophoretic particle 52 is D2, and the particle size of the first-color electrophoretic particle 51 is D3. It is arranged that D2≥D1+0.1 μm and D1≥D3+0.1 μm. By setting D2≥D1+0.1 μm, the second-color electrophoretic particles 52 do not move to the other side of the sieve plate 40 through the sieve holes 41, so that the second-color electrophoretic particles 52 may be limited to at least one side of the sieve plate 40 by the sieve plate 40. By setting D1≥D3+0.1 μm, the size of the sieve hole 41 is larger than the particle size of the first-color electrophoretic particle 51, and the first-color electrophoretic particles 51 may move freely through the sieve hole 41. As such, the second-color electrophoretic particles 52 with stable positions may be used as the display base color of the display panel 100. Under different display requirements, image display is achieved by controlling the first-color electrophoretic particles 51 of different colors to move to the side of the display panel 100 facing the output surface. Compared with the existing technology, the movement control of electrophoretic particles of one color is reduced, which is beneficial to improving the refresh frequency of related display devices and reducing display power consumption.

Optionally, when the orthographic projection of the sieve hole 41 on the plane of the array substrate 20 is a circle, the size of the sieve hole 41 is the diameter of the circle. When the orthographic projection of the sieve hole 41 on the plane of the array substrate 20 is a rectangle, the size of the sieve hole 41 is the diagonal length of the rectangle. When the orthographic projection of the sieve hole 41 on the plane of the array substrate 20 is another shape, the size of the sieve hole 41 may be the longest distance in the shape. Optionally, when the electrophoretic particle 50 is spherical, the particle size of the electrophoretic particle 50 is the longest inner diameter of the sphere. When the electrophoretic particle 50 is cube, the particle size of the electrophoretic particle 50 is the longest inner dimension of the cube. When the electrophoretic particle 50 has another three-dimensional shape, the particle size of the electrophoretic particle 50 is the longest inner dimension in the three-dimensional shape. The sieve holes 41 and electrophoretic particles 50 may have various regular and irregular shapes depending on specific needs and designs.

Figure 20:
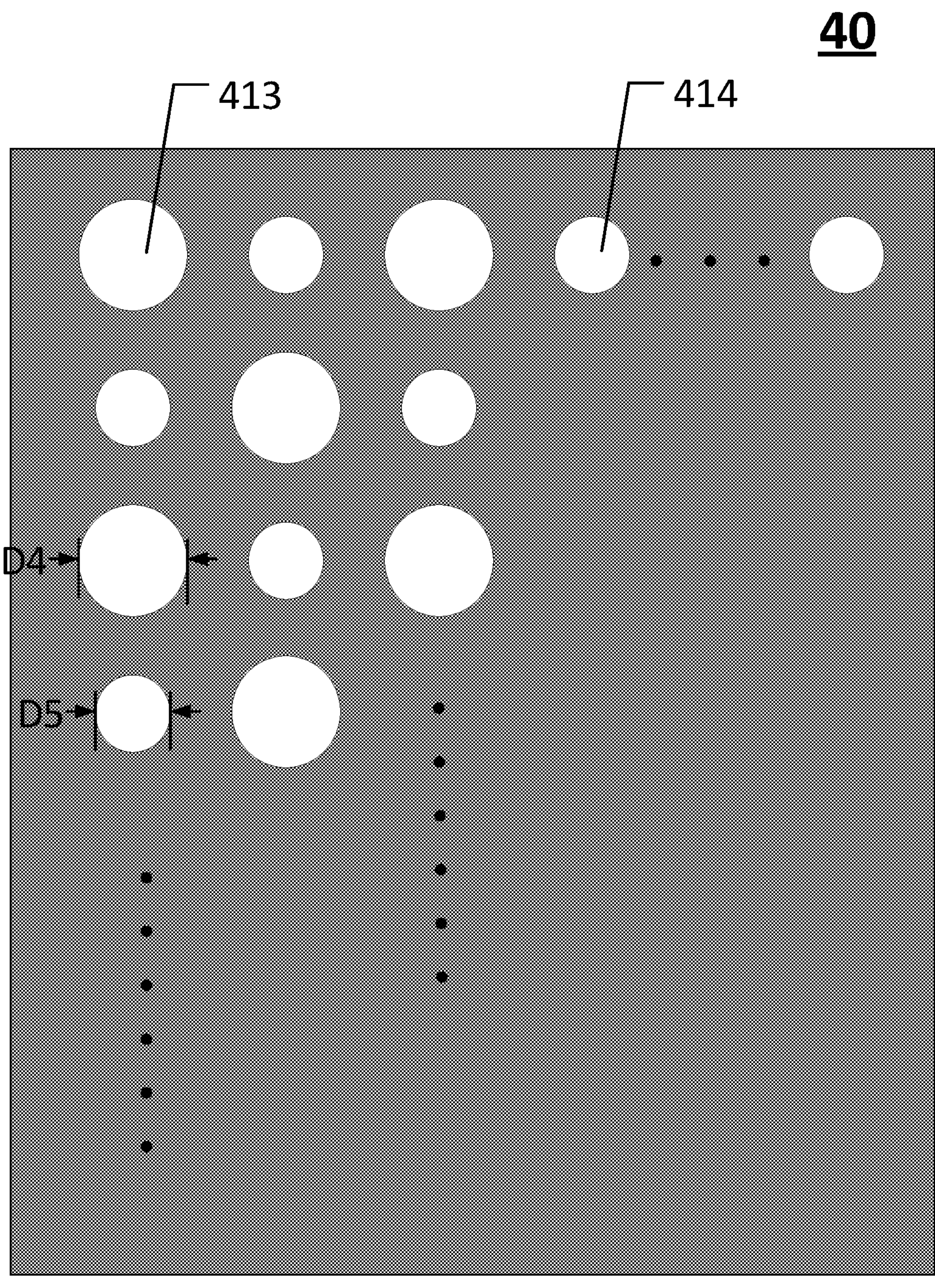
FIG. 20 illustrates a schematic top view of a sieve plate according to various disclosed embodiments of the present disclosure.

FIG. 20 illustrates a schematic top view of the sieve plate 40 according to the present disclosure. Referring to FIGS. 1-4 and 20, the sieve holes 41 include first sub-sieve holes 413 and second sub-sieve holes 414. The size of the first sub-sieve hole 413 is D4, the size of the second sub-sieve hole 414 is D5, and it is arranged that D4≠D5 in some cases. The first sub-sieve holes 413 and second sub-sieve holes 414 are alternately arranged on the sieve plate 40.

Optionally, the sieve holes 41 provided in the sieve plate 40 contain more than one shape and more than one size. The sieve holes 41 include the first sub-sieve hole 413 and second sub-sieve hole 414. The sizes of the first and second sub-sieve holes 413 and 414 are different. In some cases, the first sub-sieve holes 413 and second sub-sieve holes 414 may be arranged on the sieve plate 40 in an alternating manner. Sieve holes 41 with different sizes may be used for the passage of electrophoretic particles 50 of specific sizes and shapes. Further, such an arrangement may efficiently realize display requirements of showing images in different areas of the display panel 100.

Optionally, the display panel 100 includes three or more types of electrophoretic particles. Different electrophoretic particles correspond to different sizes of sieve holes in the sieve plate 40, thereby achieving targeted passage of electrophoretic particles of different sizes.

Figure 21:
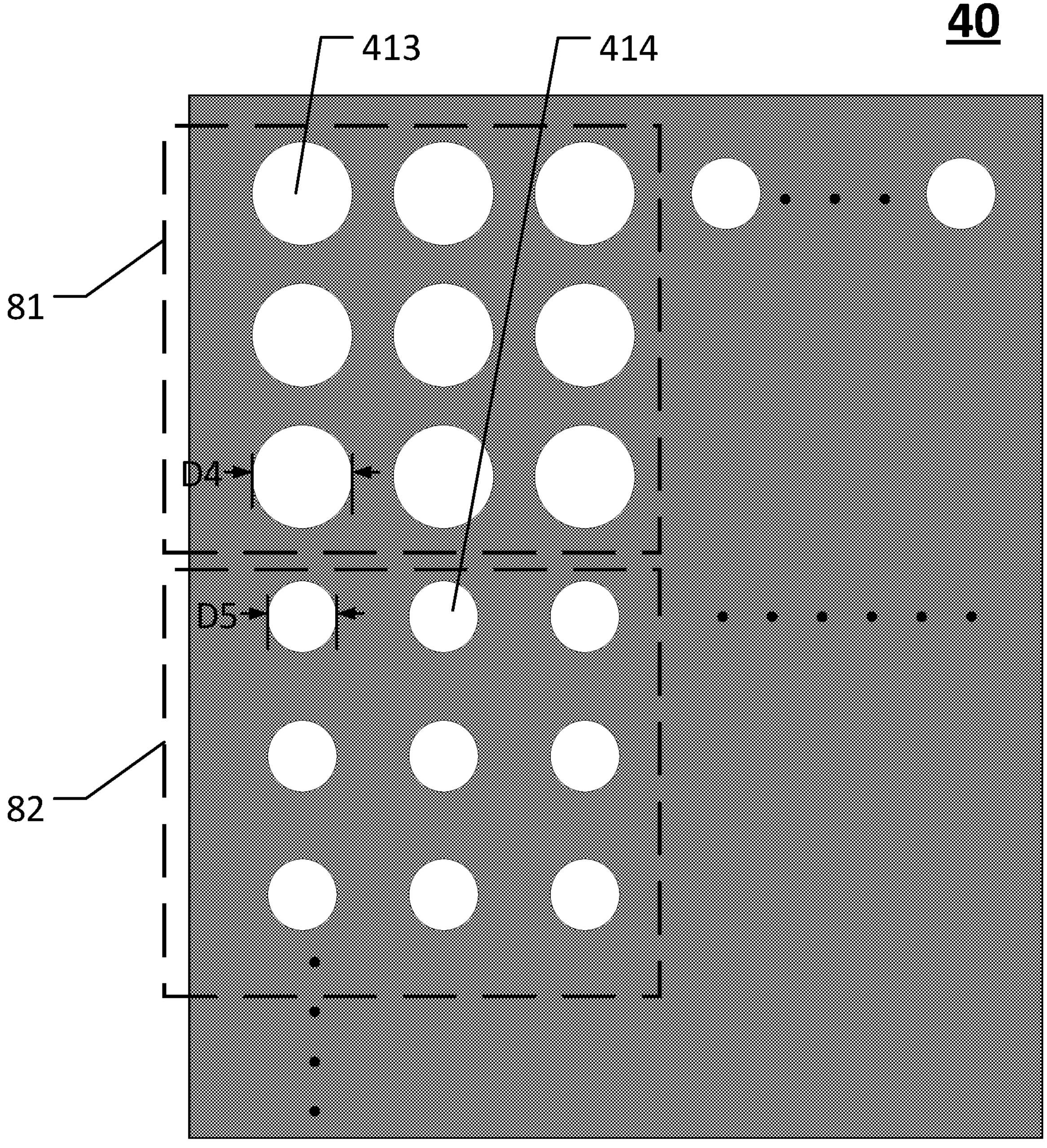
FIG. 21 illustrates another schematic top view of a sieve plate according to various disclosed embodiments of the present disclosure.

FIG. 21 illustrates another schematic top view of the sieve plate 40 according to the present disclosure. Referring to FIGS. 1-4 and 21, the sieve holes 41 include the first sub-sieve holes 413 and second sub-sieve holes 414. The size of the first sub-sieve hole 413 is D4, the size of the second sub-sieve hole 414 is D5, and it is arranged that D4≠D5 in some cases. The first sub-sieve holes 413 are in a first region 81 of the sieve plate 40, and second sub-sieve holes 414 are in a second region 82 of the sieve plate 40. The first and second regions 81 and 82 do not overlap.

Optionally, the sieve holes 41 of the sieve 40 include more than one shape and size. For example, the sieve holes 41 include the first sub-sieve holes 413 and second sub-sieve holes 414. In some cases, the sizes of the first and second sub-sieve holes 413 and 414 are different. The first sub-sieve holes 413 are in the first region 81 of the sieve plate 40, and second sub-sieve holes 414 are in the second region 82 that is outside the first region 81. Sieve holes 41 have different sizes and shapes in different regions, which may be used for the passage of electrophoretic particles 50 of corresponding sizes and shapes. Such an arrangement may efficiently realize the display requirements of showing images in different areas of the display panel 100.

Figure 22:
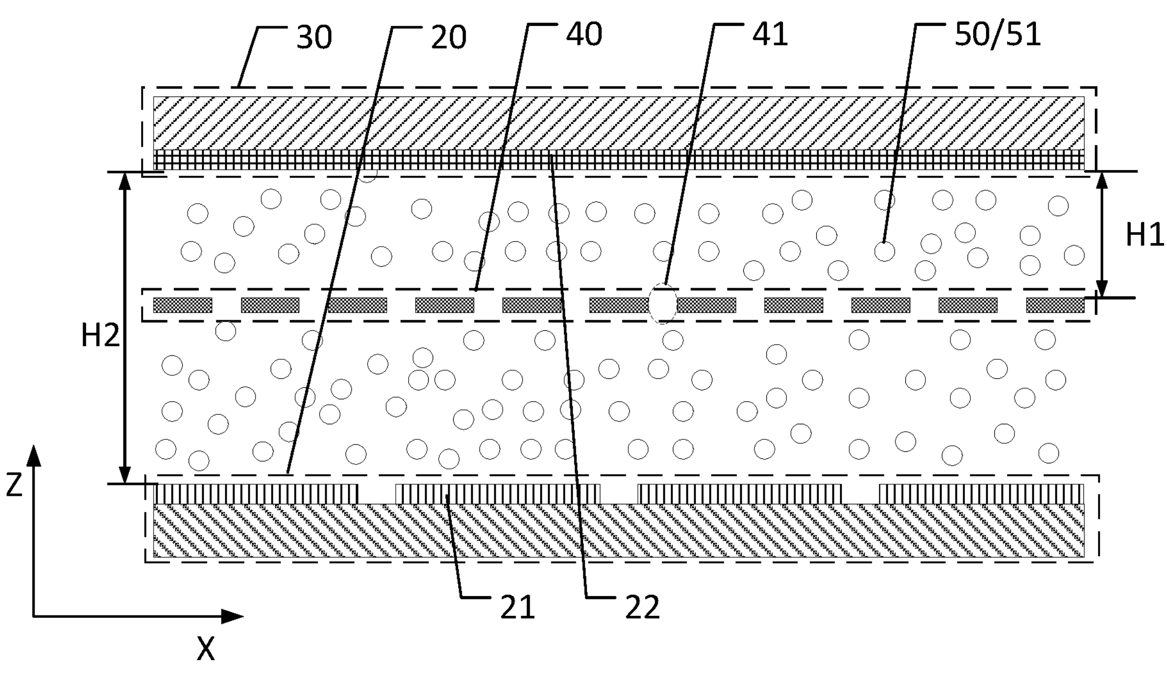
FIG. 22 illustrates another cross-sectional view taken along line AA' of FIG. 1 according to various disclosed embodiments of the present disclosure.
Figure 23:
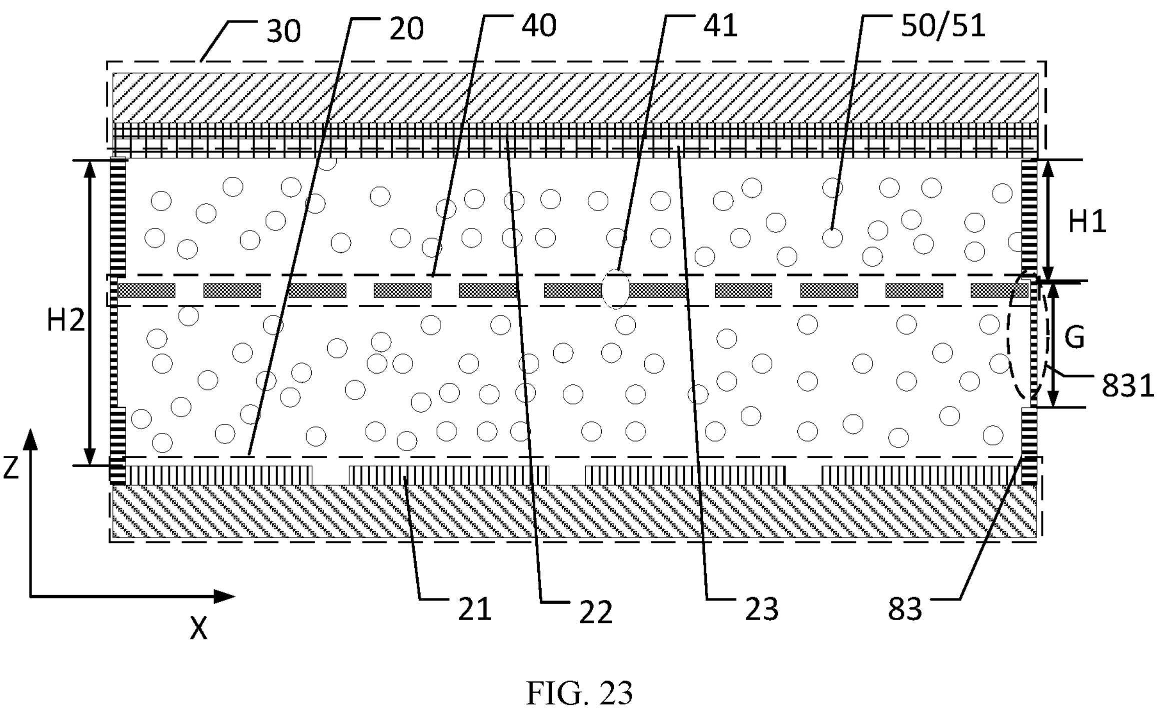
FIG. 23 illustrates another cross-sectional view taken along line AA' of FIG. 1 according to various disclosed embodiments of the present disclosure.

FIG. 22 illustrates another cross-sectional view taken along line AA' of FIG. 1 according to the present disclosure. FIG. 23 illustrates another cross-sectional view taken along line AA' of FIG. 1 according to the present disclosure. Referring to FIGS. 1, 2, 22, and 23, along the thickness direction Z, a first spacing H1 is between the sieve plate 40 and the opposite substrate 30, and a second spacing H2 is between the array substrate 20 and the opposite substrate 30, and ½*H2≤H1≤⅔*H2 is arranged optionally.

As shown in FIG. 2, the sieve plate 40 is disposed between the opposite substrate 30 and array substrate 20 along the thickness direction Z. The first spacing H1 is arranged between the sieve plate 40 and the opposite substrate 30, and the second spacing H2 is arranged between the array substrate 20 and opposite substrate 30. Optionally, it is set that ½*H2≤H1≤⅔*H2. That is, the sieve plate 40 is disposed at a position about ½ to ⅔ of the second spacing H2 in the thickness direction Z. As such, whether the sieve plate 40 is directly used as the display base color of the display panel 100 or the second-color electrophoretic particles 52 fixed on a side surface of the sieve plate 40 are used as the display base color, the structural component used as the display base color is not particularly far away from the output surface side of the display panel 100. It enables the structural component that displays the base color to present a stable and uniform background color in the display panel 100, thereby ensuring a good display effect of the display panel 100.

As shown in FIG. 22, the array substrate 20 includes a first electrode 21 and the opposite substrate 30 includes a second electrode 22 in some cases. Along the thickness direction Z, the sieve plate 40 is located between the first electrode 21 and the second electrode 22. The first electrode 21 may be a pixel electrode, and the second electrode 22 may be a common electrode. The common electrode is located on a side surface of the opposite substrate 30 facing the array substrate 20, and the pixel electrode is located on a side surface of the array substrate 20 facing the opposite substrate 30. Optionally, the first distance H1 is the distance between the common electrode and the sieve plate 40 along the thickness direction Z, and the second spacing H2 is the spacing between the pixel electrode and the common electrode along the thickness direction Z.

As shown in FIG. 23, the array substrate 20 includes the first electrode 21 and the opposite substrate 30 includes the second electrode 22. Along the thickness direction Z, the sieve plate 40 is located between the first electrode 21 and the second electrode 22. The first electrode 21 may be a pixel electrode, and the second electrode 22 may be a common electrode. The common electrode is located on a side surface of the opposite substrate 30 facing the array substrate 20. The pixel electrode is located on a side surface of the array substrate 20 facing the opposite substrate 30. Further, as shown in FIG. 23, an insulating layer 23 is provided on a side surface of the common electrode facing the pixel electrode. In such cases, the above-mentioned first spacing is the distance between the insulation layer 23 and the sieve plate 40 along the thickness direction Z. The above-mentioned second spacing is the distance between the pixel electrode and the insulating layer 23 along the thickness direction Z. In addition, when the insulating layer 23 is provided on one side of the common electrode facing the pixel electrode, an insulating layer 23 may be provided on a side of the pixel electrode facing the opposite substrate 30. Alternatively, the side surface of the pixel electrode facing the opposite substrate 30 may be provided with the insulating layer 23, while the side surface of the common electrode facing the pixel electrode is not provided with an insulating layer. Optionally, the position and quantity of the insulating layer 23 included in the display panel 100 may be adjusted according to the needs, and the above-mentioned first spacing and second spacing may also change accordingly.

Optionally, the insulating layer 23 may be used to prevent a layer of the electrophoretic particles 50 composed of a low-viscosity dye from overflowing to the outside. The insulating layer 23 may also be used to prevent moisture from penetrating into the layer of the electrophoretic particles 50 and causing the layer of electrophoretic particles 50 to fail.

Figure 24:
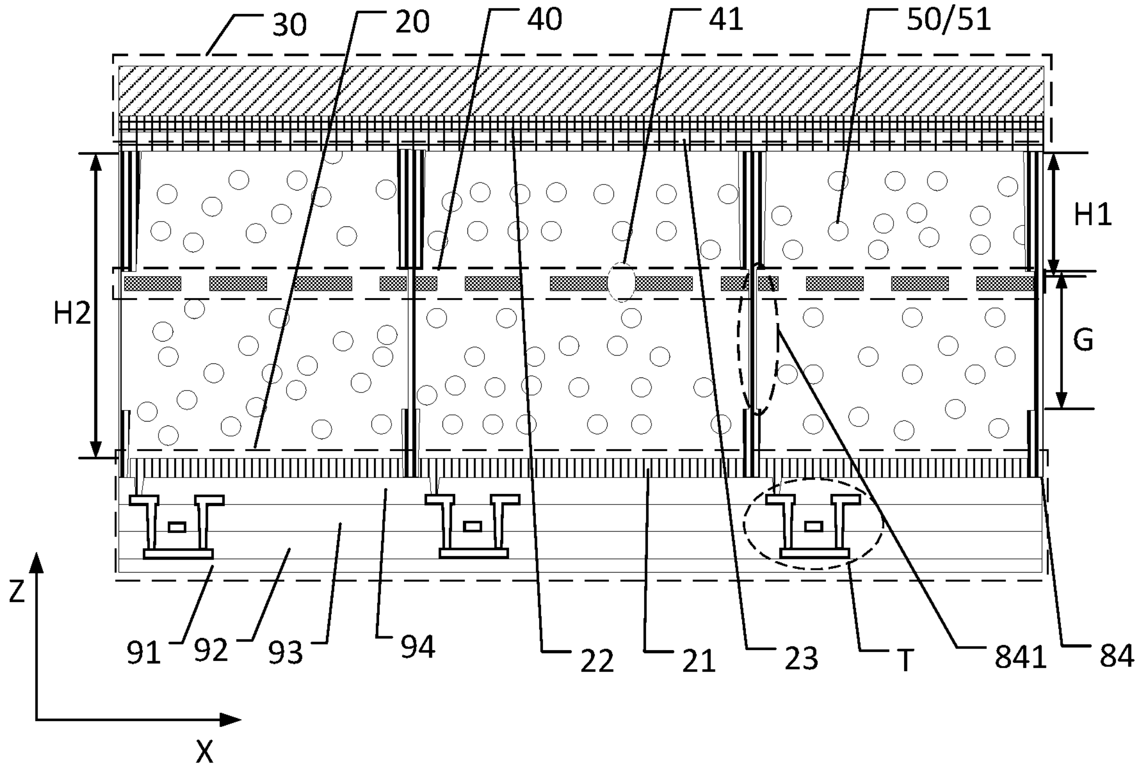
FIG. 24 illustrates another cross-sectional view taken along line AA' of FIG. 1 according to various disclosed embodiments of the present disclosure.

Referring to FIGS. 1, 23, and 24, the sieve plate 40 is a conductor in some cases.

Optionally, the sieve plate 40 is a conductor. An electric field is set in the space where the sieve plate 40 is located. The movement of the sieve plate 40 in the thickness direction Z is controlled by the electric field. Along the thickness direction Z, the sieve plate 40 has a first shift space G. The first shift space G is arranged for the sieve plate 40 to move around in the thickness direction Z. Further, it is set that $\frac{1}{2}*H2 \leq H1 \leq \frac{2}{3}*H2$. That is, the sieve plate 40 is disposed at a position about ½ to ⅔ of H2 in the thickness direction Z. Along the thickness direction Z, the first shift space G of the sieve plate 40 is located between ½ to ⅔ of H2. The sieve plate 40 may be moved in the first shift space G according to the needs through the electric field. The sieve plate 40 may be positioned at a required position through the electric field. It is convenient to adjust the position of the sieve plate 40 according to different scenarios. The sieve plate 40 is arranged at a position of ½ to ⅔ of H2 in the thickness direction Z. Whether the sieve plate 40 is directly used as the display base color of the display panel 100, or the second-color electrophoretic particles 52 arranged on a side surface of the sieve plate 40 are used as the display base color, the structural component used as the display base color is not particularly far from the output surface side of the display panel 100. It enables the structural component that displays the base color to present a stable and uniform background color in the display panel 100. It also ensures a good display effect of the display panel 100.

For example, when the display image of the display panel 100 needs to show the base color, the sieve plate 40 may be moved toward the output surface side of the display panel 100 through an electric field. When the display image of the display panel 100 needs to show other colors, the sieve plate 40 may be moved to a side away from the output surface of the display panel 100 through the electric field. It leaves enough movement space for electrophoretic particles 50 of other colors on the side close to the output surface of the display panel 100, and reduces the impact of the display base color on other display colors. The display effect of the display panel 100 may be improved.

The array substrate 20 includes the first electrode 21 and the opposite substrate 30 includes the second electrode 22. Along the thickness direction Z, the sieve plate 40 is located between the first electrode 21 and the second electrode 22. The first electrode 21 may be the pixel electrode, and the second electrode 22 may be the common electrode. The common electrode is located on a side surface of the opposite substrate 30 facing the array substrate 20. The pixel electrode is located on a side surface of the array substrate 20 facing the opposite substrate 30. Optionally, the pixel electrode is used to receive a first voltage signal, and the common electrode is used to receive a second voltage signal. The first voltage signal includes a first voltage value that is different from a second voltage value included in the second voltage signal. The voltage difference and the direction of the electric field are used to change positions of at least part of the electrophoretic particles 50 or the position of the sieve plate 40 in the display panel 100. The electrophoretic particles 50 included in the display panel 100 may contain at least one of black electrophoretic particles 50, white electrophoretic particles 50, yellow electrophoretic particles 50, and red electrophoretic particles 50. When the electrophoretic particles 50 in the display panel 100 include n colors, the display module may include n driving waveforms and corresponding voltage group settings, where n is a positive integer. Optionally, one driving waveform and corresponding voltage are used to drive the sieve plate 40, while n−1 driving waveforms and corresponding voltages are used to drive electrophoretic particles 50 of different colors except the white electrophoretic particles 50 (i.e., basic-color electrophoretic particles 50).

In the current technology, when the display module includes m colors of electrophoretic particles 50, correspondingly m driving waveforms and voltages are required to drive the electrophoretic particles 50 of each color. In the above-described embodiment, when the sieve plate 40 has a fixed position and/or positions of the white electrophoretic particles 50 (i.e., basic-color electrophoretic particles 50) are fixed, only m−1 waveforms and corresponding voltages are needed to drive electrophoretic particles 50 of different colors except the white electrophoretic particles 50. Compared with the existing technology, the number of driving waveforms and voltage groups required for the display panel 100 to achieve color display is reduced. It may reduce the power consumption of related display devices.

Optionally, the sieve plate 40 may be made of materials with relatively high hardness, so that the sieve plate 40 may be formed as a hard plate. If the sieve plate 40 is too soft, moving electrophoretic particles may hit the sieve plate 40 to cause it to deform, which may make the structure of the sieve plate 40 unstable. A sieve plate 40 with certain hardness avoids the deformation problems and ensures the structural stability of the display panel.

FIG. 24 illustrates another cross-sectional view taken along line AA' of FIG. 1 according to the present disclosure. Referring to FIGS. 1, 23, and 24, a seal 83 is arranged between the array substrate 20 and opposite substrate 30. In some cases, the seal 83 may be made of a plastic material and formed as a plastic seal. Along a direction in a plane where the display panel 100 is located, the seal 83 includes a recessed portion 831 on a side facing the center of the display panel 100. The recessed portion 831 holds the sieve plate 40.

Alternatively, spacer columns 84 may be arranged between the array substrate 20 and opposite substrate 30. The sidewall of the spacer column 84 includes a recessed portion 841. The recessed portion 841 holds the sieve plate 40.

Optionally, the position of the sieve plate 40 in the display panel 100 is fixed by the seal 83 disposed between the array substrate 20 and opposite substrate 30. The seal 83 may be made of a plastic material optionally. The seal 83 includes the recessed portion 831 on a side facing the center of the display panel 100 in a direction in a plane of the display panel 100. The recessed portion 831 is used to hold the sieve plate 40. The seal 83 may be configured in the non-display area 11 of the display panel 100.

Alternatively, the spacer columns 84 are disposed between the array substrate 20 and opposite substrate 30. The recessed portions 841 are arranged on the sidewalls of the spacer columns 84. The recessed portions 841 of the columns 84 are used to hold the sieve plate 40. The spacer columns 84 may be configured in a non-opening area in the display area 10 of the display panel 100.

The above-illustrated two methods and other methods may be used to hold the sieve plate 40. The position fixing method of the sieve plate 40 in the display panel 100 may be selected according to the needs.

Optionally, the recessed portions 831 and 841 as shown in FIGS. 23 and 24 have relatively large dimensions in the thickness direction Z. These dimensions are for illustration purpose only. For example, these dimensions may be equal to or slightly larger than the thickness of the sieve plate 40 in the thickness direction Z in some cases.

As exemplarily shown in FIG. 24, the array substrate 20 optionally includes a substrate 91 and transistors T formed on a side of the substrate 91. The active layer of the transistor T is formed on a side of the substrate 91 facing the opposite substrate 30. The gate electrode of the transistor T is formed on a side of a first insulating layer 92 facing the opposite substrate 30. The source and drain electrodes of the transistor T are formed on a side of a second insulating layer 93 facing the opposite substrate 30. The first electrode 21 is formed on a side of a third insulating layer 94 away from the transistor T, and electrically connected to the source or drain of the transistor T.

Referring to FIGS. 1 and 3, the second-color electrophoretic particles 52 are white electrophoretic particles 50 in some cases.

Since the display base color (i.e., background color) of the display panel 100 is generally white, the second-color electrophoretic particles 52 may be white electrophoretic particles 50 optionally. Alternatively, the color of the second-color electrophoretic particles 52 may be selected according to the requirement of background color of the display panel 100. Further, the white electrophoretic particles 50 may carry charges to avoid agglomeration problems.

Figure 25:
FIG. 25 illustrates schematic diagram of a display device according to various disclosed embodiments of the present disclosure.
Figure 25:
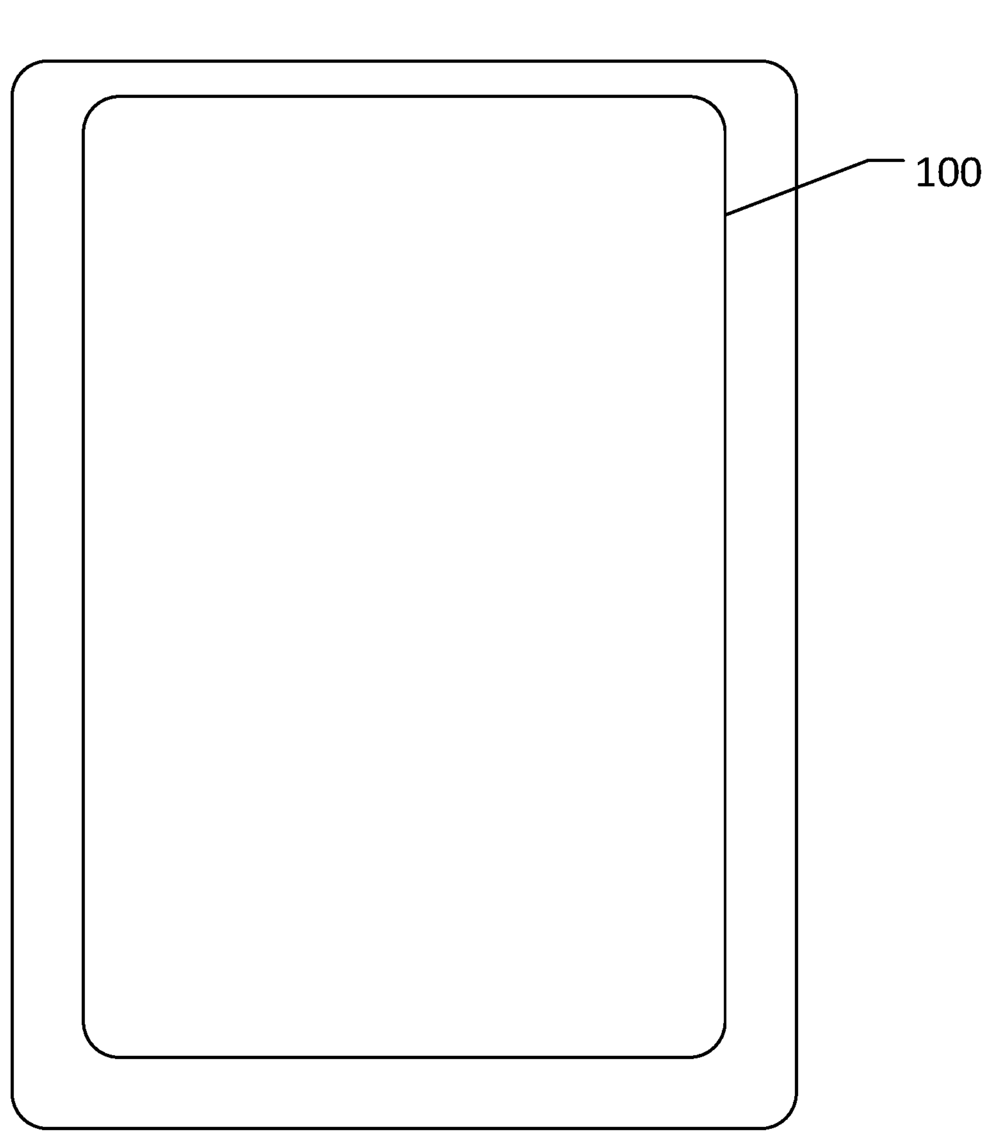

FIG. 25 illustrates a schematic diagram of a display device 200 according to the present disclosure. The display device 200 includes the display panel 100. The display panel may be any display panel 100 provided by the present disclosure as described above.

For the embodiments of the display device provided by the present disclosure, reference may be made to descriptions illustrated above, which will not be described again. The display device provided by the present disclosure may include e-readers, electronic labels, mobile phones, tablets, televisions, monitors, laptops, car displays, navigators, and any products and components with display functions.

The display panel and display device provided by the present disclosure at least achieve the following beneficial effects.

The present disclosure provides a display panel and display device. A sieve plate is disposed between an array substrate and an opposite substrate in the display panel. The array substrate and opposite substrate are configured oppositely. Electrophoretic particles are arranged between the array substrate and opposite substrate. The electrophoretic particles include first-color electrophoretic particles whose particle size is smaller than the size of sieve holes of the sieve plate. The sieve holes penetrate through the sieve plate in the thickness direction. Positions of the electrophoretic particles of a certain color with a particle size larger than the sieve holes are fixed through the sieve plate. The electrophoretic particles of the certain color are used as the base color of the display panel, and at least the first-color electrophoretic particles move to the display surface side of the display panel to display a corresponding image when there is a display requirement. Alternatively, the color of the sieve plate itself may be used as the base color of the display panel, and at least the first-color electrophoretic particles may move to the display surface side of the display panel to display a corresponding image when there is a display requirement. Thus, when the display color requirement of the display panel is to display the base color, movements of electrophoretic particles are not required to achieve image display. Color display that illustrates the base color may be achieved through electrophoretic particles with fixed positions or the color of the sieve plate itself. Compared with the existing technology, the movement control of electrophoretic particles of one color is reduced, which is beneficial to improving the refresh frequency of related display devices and reducing display power consumption.

The embodiments disclosed herein are exemplary only. Other applications, advantages, alternations, modifications, or equivalents to the disclosed embodiments are obvious to those skilled in the art and are intended to be encompassed within the scope of the present disclosure.

What is claimed is:

1. A display panel, comprising:

an array substrate;

an opposite substrate disposed opposite to the array substrate;

a sieve plate between the array substrate and the opposite substrate, wherein the sieve plate includes a plurality of sieve holes, the plurality of sieve holes penetrates the sieve plate along a thickness direction of the display panel;

a plurality of electrophoretic particles, wherein the plurality of electrophoretic particles includes a plurality of first-color electrophoretic particles, and a particle size of at least one of the plurality of first-color electrophoretic particles is smaller than a size of the plurality of sieve holes; and a seal between the array substrate and the opposite substrate, wherein the seal includes a recessed portion on a side facing a center of the display panel along a direction in a plane where the display panel is located, and the recessed portion holds the sieve plate; or a spacer column between the array substrate and the opposite substrate, wherein a sidewall of the spacer column includes a recessed portion that holds the sieve plate.

2. The display panel according to claim 1, wherein the sieve plate has a first color and is not transparent, the plurality of first-color electrophoretic particles has a second color, and the second color is different from the first color.

3. The display panel according to claim 1, wherein the plurality of electrophoretic particles further includes a plurality of second-color electrophoretic particles, a color of the plurality of second-color electrophoretic particles is different from a color of the plurality of first-color electrophoretic particles, a size of at least one of the plurality of sieve holes is D1, a particle size of at least one of the plurality of second-color electrophoretic particles is D2, a particle size of at least one of the plurality of first-color electrophoretic particles is D3, it is arranged that $D2 \geq D1+0.1$ μm, and it is arranged that $D1 \geq D3+0.1$ μm.

4. The display panel according to claim 1, wherein the plurality of sieve holes includes a first sub-sieve hole and a second sub-sieve hole, a size of the first sub-sieve hole is D4, a size of the second sub-sieve hole is D5, it is arranged that $D4 \neq D5$, and the first sub-sieve hole and the second sub-sieve hole are alternately arranged on the sieve plate or the first sub-sieve hole is in a first region of the sieve plate, the second sub-sieve hole is in a second region of the sieve plate, and the first region and the second region do not overlap.

5. The display panel according to claim 1, wherein along the thickness direction of the display panel, a first spacing H1 is between the sieve plate and the opposite substrate, a second spacing H2 is between the array substrate and the opposite substrate, and it is arranged that $\frac{2}{5} * H2 \leq H1 \leq \frac{1}{2} * H2$.

6. The display panel according to claim 1, wherein the sieve plate is a conductor.

7. The display panel according to claim 1, wherein a first shift space is arranged for the sieve plate along the thickness direction of the display panel.

8. The display panel according to claim 1, wherein the array substrate includes a first electrode, the opposite substrate includes a second electrode, and the sieve plate is between the first electrode and second electrode along the thickness direction of the display panel.

9. A display panel, comprising:

an array substrate;

an opposite substrate disposed opposite to the array substrate;

a sieve plate between the array substrate and the opposite substrate, wherein the sieve plate includes a plurality of sieve holes, and the plurality of sieve holes penetrates the sieve plate along a thickness direction of the display panel; and a plurality of electrophoretic particles, wherein the plurality of electrophoretic particles includes a plurality of first-color electrophoretic particles, and a particle size of at least one of the plurality of first-color electrophoretic particles is smaller than a size of the plurality of sieve holes, wherein the sieve plate is transparent, the plurality of electrophoretic particles further includes a plurality of second-color electrophoretic particles, a color of the plurality of second-color electrophoretic particles is different from a color of the plurality of first-color electrophoretic particles, and a particle size of at least one of the plurality of second-color electrophoretic particles is larger than the size of the plurality of sieve holes.

10. The display panel according to claim 9, wherein at least one of the plurality of second-color electrophoretic particles is between the sieve plate and the opposite substrate, or between the sieve plate and the array substrate, or between a first sieve plate and a second sieve plate when the sieve plate includes the first sieve plate and the second sieve plate along the thickness direction of the display panel.

11. The display panel according to claim 10, wherein when the sieve plate includes the first sieve plate and second sieve plate, the plurality of sieve holes includes a first sieve hole and a second sieve hole, the first sieve hole is on the first sieve plate, the second sieve hole is on the second sieve plate, and the first sieve hole and the second sieve hole overlap along the thickness direction of the display panel at least partially.

12. The display panel according to claim 9, further comprising:

a blocking member, wherein the blocking member is fixedly connected with the sieve plate, the blocking member is used to restrict a movement of the plurality of second-color electrophoretic particles in a first direction, and the first direction is parallel to a plane where the sieve plate is located.

13. The display panel according to claim 12, wherein a particle size of the plurality of second-color electrophoretic particles is R, a height of the blocking member is H along the thickness direction of the display panel, and it is arranged that $R \times 50\% \leq H \leq R$.

14. The display panel according to claim 12, wherein the blocking member and the plurality of sieve holes do not overlap along the thickness direction of the display panel.

15. The display panel according to claim 12, wherein a plane where the blocking member is located is inclined in a direction away from the plurality of sieve holes.

16. The display panel according to claim 9, wherein a side of the sieve plate facing the plurality of second-color electrophoretic particles includes a plurality of restriction grooves, and at least part of the plurality of second-color electrophoretic particles is in the plurality of restriction grooves.

17. The display panel according to claim 16, wherein the plurality of restriction grooves does not overlap with at least part of the plurality of sieve holes along the thickness direction of the display panel or at least part of the plurality of restriction grooves overlaps with at least part of the plurality of sieve holes along the thickness direction of the display panel.

18. The display panel according to claim 17, wherein when the at least part of the plurality of restriction grooves overlaps with the at least part of the plurality of sieve holes along the thickness direction of the display panel, a number of the at least part of the plurality of restriction grooves overlapping the at least part of the plurality of sieve holes is greater than a number of the plurality of first-color electrophoretic particles.

19. A display device, comprising:

a display panel, wherein the display panel includes:

an array substrate;

an opposite substrate disposed opposite to the array substrate;

a sieve plate between the array substrate and the opposite substrate, wherein the sieve plate includes a plurality of sieve holes, the plurality of sieve holes penetrates the sieve plate along a thickness direction of the display panel;

a plurality of electrophoretic particles, wherein the plurality of electrophoretic particles includes a plurality of first-color electrophoretic particles, and a particle size of at least one of the plurality of first-color electrophoretic particles is smaller than a size of the plurality of sieve holes; and a seal between the array substrate and the opposite substrate, wherein the seal includes a recessed portion on a side facing a center of the display panel along a direction in a plane where the display panel is located, and the recessed portion holds the sieve plate; or a spacer column between the array substrate and the opposite substrate, wherein a sidewall of the spacer column includes a recessed portion that holds the sieve plate.

* * * * *